US007029514B1

(12) United States Patent
Yang et al.

(10) Patent No.: US 7,029,514 B1
(45) Date of Patent: Apr. 18, 2006

(54) CORE-SHELL MAGNETIC NANOPARTICLES AND NANOCOMPOSITE MATERIALS FORMED THEREFROM

(75) Inventors: Hong Yang, Rochester, NY (US);
Xiaowei Teng, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 10/801,696

(22) Filed: Mar. 17, 2004

Related U.S. Application Data

(60) Provisional application No. 60/454,615, filed on Mar. 17, 2003.

(51) Int. Cl.
*B22F 9/24* (2006.01)
(52) U.S. Cl. .............................. 75/348; 75/351; 75/362
(58) Field of Classification Search .................. 75/348, 75/351, 362
See application file for complete search history.

(56) References Cited

U.S. PATENT DOCUMENTS

| 6,045,925 | A | 4/2000 | Klabunde et al. | |
|---|---|---|---|---|
| 6,302,940 | B1 | 10/2001 | Murray et al. | |
| 6,710,366 | B1 * | 3/2004 | Lee et al. | 257/14 |
| 2002/0177143 | A1 | 11/2002 | Mirken et al. | |
| 2003/0039860 | A1 | 2/2003 | Cheon et al. | |
| 2003/0190475 | A1 | 10/2003 | Carpenter et al. | |
| 2004/0020327 | A1 * | 2/2004 | Hattori et al. | 75/348 |
| 2004/0253443 | A1 | 12/2004 | Anselmann et al. | |

OTHER PUBLICATIONS

Park, Jong-II et al., Characterization of Superparamagnetic "Core-Shell" Nanoparticles and Monitoring their Anisotropic Phase Transition to Ferromagnetic "Solid Solution" Nanoalloys, J.Am. Chem. Soc., vol. 126, No. 29, pp. 9072-9078, Jul. 1, 2004.*
Kablunde et al. "Unique Chemical Reactivities of Nanocrystalline Metal Oxides toward Hydrogen Sulfide", Chemical Matter, 14, 2002, pp 1806-1811.
Luo et al. "Catalytic activation of core-shell assembled gold nanoparticles as catalyst for methanol electrooxidation", Catalysis Today, 77, 2002, pp 127-138.
Chen et al. Low-Termperature Hydrodesulfurization of Thiophene on Ni/Pt(1 1 1) Bimetallic Surfaces with Monolayer Ni Coverage, Journal of Catalysis, 205, 2002, pp 259-265.

(Continued)

*Primary Examiner*—George Wyszomierski
(74) *Attorney, Agent, or Firm*—Oliff & Berridge, PLC

(57) ABSTRACT

Monodisperse core-shell types of metal, metal oxide, and alloy nanoparticles with variable core diameters and shell thicknesses, and controlled synthesis methods for producing such nanoparticles are provided. Nanocomposite materials fabricated from nanoparticles, and methods for producing such nanocomposite materials are also provided.

33 Claims, 27 Drawing Sheets

OTHER PUBLICATIONS

Murray et al. "Monodisperse 3d Transition-Metal (Co, Ni, Fe) Nanoparticles and Their Assembly into Nanoparticle Superlattices", MRS Bulletin, 2001, pp 985-991.

Zeng et al "Exchange-coupled nanocomposite magnets by nanoparticle self-assembly", Nature, vol. 420, 2002, pp 395-398.

Skumryer et al. "Beating the superparamagnetic limit with exchange bias", Nature, vol. 423, 2003, pp 850-853.

Teng et al. "Synthesis of Face-Centered Tetragonal FePt Nanoparticles and Granular Films for Pt@$Fe_2O_3$ Core-Shell Nanoparticles", Journal of the American Chemical Society, vol. 125, 2003, pp 14559-14563.

Teng et al. "Platinum-Maghemite Core-Shell Nanoparticles Using a Sequential Synthesis", Nano Letters, vol. 3, No. 2, 2003, pp 261-264.

Guo et al. "Patterned Langmuir-Blodgett Films of Monodisperse Nanoparticles of Iron Oxide Using Soft Lithography", Journal of American Chemical Society, 2002.

Sellmyer, David "Strong magnets by self-assembly", Nature Publishing Group, vol. 420, 2002.

Zeng et al. "Bimagnetic Core/Shell FePt/$Fe_3O_4$ Nanoparticles", Nano Letters, vol. 4, No. 1, 2004, pp 187-190.

* cited by examiner

CORE-SHELL MAGNETIC NANOPARTICLES AND NANOCOMPOSITE MATERIALS FORMED THEREFROM

BACKGROUND OF THE INVENTION

1. Field of Invention

The present invention is directed to core-shell types of metal, metal oxide and alloy nanoparticles with variable core diameters and shell thicknesses, and controlled synthesis methods for producing such nanoparticles. The present invention is also directed to nanocomposite materials fabricated from nanoparticles, such as the nanoparticles provided by this invention, and methods for producing such nanocomposite materials.

2. Description of Related Art

Nanoparticle based materials have been under investigation because of their novel catalytic, electronic, magnetic and optical properties. Among the various materials, transition metal nanoalloys containing core-shell types of nanoparticles are particularly interesting. The magnetic and chemical properties of these nanoparticles have significantly enhanced functions that do not exist in single-component compounds combined with unique properties that exist only in nm-sized materials.

Klabunde et al., *J. Chem. Mater.*, 14: 1806–1811 (2002), demonstrated that $Fe_2O_3$-coated metal oxide core-shell nanoparticles such as MgO@$Fe_2O_3$ and CaO@$Fe_2O_3$ have greatly enhanced efficiencies over pure MgO and CaO catalysts for $SO_2$ adsorption, $H_2S$ removal, and chlorocarbon destruction. The improved catalytic behavior comes from the cooperative interaction between the core and the shell of the catalyst.

Luo et al., *Catal. Today*, 77: 127–138 (2002), showed that gold-based core-shell nanoparticles can efficiently catalyze the electrooxidation of methanol. The metal-oxide-on-metal core-shell configuration (Au@AuOx) is believed to be the contributing factor for the high catalytic behaviors. Chen et al., *J. Catal.*, 205: 259–265 (2002), showed that well balanced bimetallic surfaces of nickel on platinum can drastically enhance the catalytic hydrodesulfurization of thiophene per surface metal atom over a pure platinum surface.

Recent efforts have focused on the development of magnetic nanoalloys for their potential use for ultrahigh density magnetic recording media. Nanoalloy particles offer the advantages of significantly higher magnetic anisotropy, enhanced magnetic susceptibility, large coercivities and good chemical corrosion resistance. Transition metal alloy nanoparticles such as CoPt and FePt are excellent candidates.

Previous synthesis methods of magnetic alloys include vacuum deposition, metal evaporation, sintering and co-sputtering. These techniques allow limited control over particle size, size distribution and composition distribution in the nanocomposite materials.

More current synthesis methods include chemical approaches in solution and offer better control of magnetic nanomaterial growth. These techniques are largely based on the reduction of metal salts by a borohydride or by a diol or polyalcohol (the "polyol process"), and the thermal decomposition of organometallic precursors. For instance, U.S. Pat. No. 6,302,940 B2 to Murray et al. describes the synthesis of magnetic FePt alloy nanoparticles by the combination of in-situ reduction of platinum acetylactonate ($CH_3COCHCOCH_3$ anion) by long chain diol and thermal decomposition of $Fe(CO)_5$ in the presence of mixed surfactants. Using a similar method, Murray et al. further describe, in *MRS Bulletin* 26, 985–991 (2001), the synthesis of CoNi alloy nanoparticles using $Co_2(CO)_8$.

The polyol process creates monodisperse FePt nanoparticles in disordered face-centered cubic (fcc) phases at low temperatures. The assembly of FePt particles can then be converted into face-centered tetragonal (fct) FePt hard magnetic crystalline materials by annealing at temperatures of about 650° C. However, using the approach developed by Sun, Murray et al., the nanostructures are lost after the annealing process. The formation of monodisperse FePt nanoparticles with different sizes are believed to be governed by the surfactants that chemically bond to the surfaces of FePt nanoparticles.

Nanocomposite is another extremely valuable class of hard-magnetic materials. Theoretical predictions suggest that composites with nanometer sized soft and hard magnetic domains (<about 10 nm in diameter), created through a so-called exchange coupling mechanism, can possess a high energy product that does not exist in single phase materials.

The availability of such nanocomposites, however, are very limited because it is not trivial to precisely control the nm scale domains for both soft and hard magnetic materials simultaneously in magnetic composites. Moreover, the tolerances for the performance of modern materials and devices based on such magnetic materials requires high uniformity.

Zeng et al., *Nature*, 420: 395–398 (2002), recently demonstrated a method for making a magnetic nanocomposite film with interwoven structures of hard-soft magnetic domain using FePt and $Fe_3O_4$ nanoparticle assembly. In this bottom-up approach, FePt and $Fe_3O_4$ nanoparticles were allowed to self-assemble and subsequently were converted to FePt—$Fe_3Pt$ alloy thin films at enhanced temperatures. The exchange coupling between soft and hard components (FePt and $Fe_3Pt$) produced a mixed hard-soft nanocomposite with much higher magnetic energy product than pure FePt alloy.

One apparent difficulty in this approach that could limit the energy product is the homogenous mixing of two entirely different monodisperse magnetic nanoparticles of $Fe_3O_4$ and FePt. Accordingly, homogeneity in the final product is achieved only in small quantities in local regions. Producing fine regular nm-sized domains over a large area, important for efficient exchange coupling, is crucial. The unmediated self-assembly of different types of nanoparticles can only create inadequate packing orders with almost no control of the packing density and number of layers deposited.

As demonstrated by Skumryev et al, *Nature*, 423: 850–853 (2003), in addition to exchange-coupled nanocomposites, exchanged-bias nanocomposites are yet another class of important magnetic materials that hold promise for high magnetic storage media applications.

SUMMARY OF THE INVENTION

It continues to be a challenge in the area of solid state nanomaterials to precisely control the chemical composition, structure, size and shape of nanoparticles. The controlled structuring of nanomaterials could enhance their properties. Desirable properties include high coercivity, small domain wall width, small minimal stable grain size, large magnetic anisotropy and chemical stability.

Applicants have developed a synthesis method that offers great advantages in making core-shell nanoparticles. Furthermore, these core-shell nanoparticles are an excellent source precursor to magnetic homogenous nanocomposite films, powders and other bulk forms. The method allows for the synthesis of compositionally complex and tunable monodisperse nanoparticles and the conversion to thin films, powders and other bulk forms of magnetic nanocomposites of particular classes of metal alloys that are of great interest in ultra-high magnetic density storage media.

The present invention provides a sequential synthesis method for making composition tunable core-shell nanoparticles. In a general synthesis, core particles of materials such as platinum, cobalt, $SmCO_5$ and platinum cobalt alloys, are first synthesized in solution. Shell layers are then deposited immediately on the nanoparticle core in the same reaction vessel. The synthesis method provides control over the chemical composition, size and structure of the nanoparticles by changing the concentrations of reactants, surfactant capping groups, solvents and the reaction conditions. This two-step route to core-shell nanoparticles allows for manipulation of the core diameter and shell thickness of the core-shell nanoparticles in a controlled manner.

The synthesized nanoparticles also provide an improved source for making nanocomposite films and bulk forms. Because the particles are single-source precursors they eliminate the need for homogenous mixing of two or more types of particles. The required chemical compositions and nanostructures can be pre-modulated prior to the particle assembly by using core-shell nanoparticles with appropriate core diameter and shell thickness. The synthesis method allows for fine tuning the domain structures and compositions in the thin films and bulk forms made from various modulated core-shell nanoparticles.

The present invention is directed to monodisperse core-shell types of metal, metal oxide, and alloy nanoparticles with variable core diameters and shell thicknesses. The present invention is further directed to controlled synthesis methods for producing monodisperse core-shell types of metal and alloy nanoparticles with variable core diameters and shell thicknesses. The present invention is also directed to nanocomposite materials fabricated from monodisperse core-shell types of metal and alloy nanoparticles with variable core diameters and shell thicknesses. In addition, the present invention is directed to methods for producing nanocomposite materials using monodisperse core-shell types of metal and alloy nanoparticles with variable core diameters and shell thicknesses.

In various exemplary embodiments, the monodisperse core-shell nanoparticles according to this invention include a core including at least a first transition metal-containing material and at least one shell layer including at least a second transition metal-containing material.

In various exemplary embodiments, the methods for forming core-shell nanoparticles according to this invention include forming a solution of a reducing agent and a solvent under inert gas, adding a metal salt into the solution to form nanoparticle cores and adding an organometallic compound into the solution and heating to produce shell layers over the nanoparticle cores.

In various exemplary embodiments, the methods for forming nanocomposite materials according to this invention include forming a solution of a reducing agent and a solvent under inert gas, adding a metal salt into the solution to form nanoparticle cores, adding an organometallic compound into the solution and heating to produce shell layers over the nanoparticle cores to produce core-shell nanoparticles, depositing the core-shell nanoparticles on a substrate and thermally annealing the nanoparticles on the substrate to reduce the metal oxide shell and form an magnetic alloy nanocomposite.

For a better understanding of the invention as well as other aspects and further features thereof, reference is made to the following drawings and descriptions.

DETAILED DESCRIPTION OF PREFERRED EMBODIMENTS

Figure 1A:
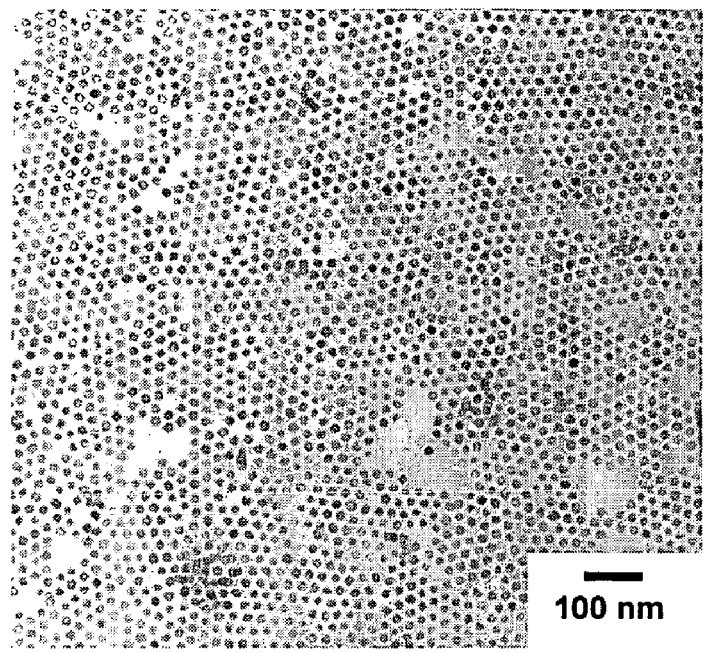
FIG. 1(a) is a low magnification TEM micrograph of exemplary core-shell nanoparticles according to this invention.

In various exemplary embodiments, the present invention provides controlled synthesis methods for producing monodisperse core-shell types of metal, metal oxide, and alloy nanoparticles with variable core diameters and shell thicknesses. As used herein and generally recognized in the art, the definition "X@Y," referring to a core-shell nanoparticle, means a particle having a core of X and a shell of Y. The core-shell nanoparticles according to this invention are monodisperse and can be controlled for size. For example, in the case of Pt@$Fe_2O_3$ core-shell nanoparticles having a core of Pt and shell layers of $Fe_2O_3$, the thickness of the shells can be controlled by varying the concentration of reactants during synthesis. For example, nanoparticles made using a Pt(acac)$_2$/Fe(CO)$_5$ mole ratio of 1:2 have a Pt core with an average core diameter of about 10 nm and a $Fe_2O_3$ shell of about 3.5 nm thick. Alternatively, nanoparticles made using a Pt(acac)$_2$/Fe(CO)$_5$ mole ratio of 1:4 have shells about 5.4 nm thick. The core-shell nanoparticles according to the present invention are chemically stable.

In various exemplary embodiments, core particles are formed from various materials including, but not limited to, transition metals such as Fe, Co, Ni, Cr, Mn, Ce, V, Nd, Nb, Gd, La, Ta, Pr, Eu, Hf, Er, Pt, Au, Ag, Cu, Pd and Sm and combinations thereof such as $Sm_xCo_y$, $Fe_xPt_y$, and $Co_xPt_y$. Exemplary combinations include Pt, $Fe_3Pt$, FePt, $FePt_3$, PtCo, $Pt_3Co$, Co and $SmCo_5$. In various exemplary embodiments, shell layers of core-shell nanoparticles are formed metals or metal oxides including, but not limited to Co, Fe, $Fe_2O_3$, $Fe_3O_4$, FeO, CoO, $Gd_2O_3$, $CrO_2$, Ni, NiO and $Sm_xCo_y$.

Various exemplary embodiments of the present invention include methods for forming well-defined core-shell nanoparticles, including formation of a core nanoparticle followed by deposit of shell layers on the nanoparticle core. For example, well-defined Pt@$Fe_2O_3$ core-shell nanoparticles can be produced by forming a core nanoparticle of Pt followed by depositing shell layers of $Fe_2O_3$ on the nanoparticle core. In various exemplary embodiments, the formation of the core occurs by the reduction of a metal salt by a 1,2-diol, in a solvent at reflux temperature. For example, a Pt core can be formed by reduction of a Pt-salt, such as Pt(acac)$_2$ (acac=acetylacetonate, $CH_3COCHCOCH_3$ anion), by 1,2-hexadecanediol, in a solution of octyl ether, at the solvent reflux temperature of about 290° C. Metal salts useful in other contexts include, but are not limited to Fe(acac)$_3$, Co(acac)$_2$, Sm(acac)$_3$, Ag(CF$_3$COO) and FeCl$_2$. Then, shell layers are formed around the core particle by controlled decomposition of a metal or metal oxide. For example, shell layers can be formed around a Pt core particle by controlled decomposition of iron pentacarbonyl, Fe(CO)$_5$. Organometallic compounds useful in other contexts include, but are not limited to, Fe$_2$(CO)$_9$, Fe$_3$(CO)$_{12}$, Co$_2$(CO)$_8$ and Co$_4$(CO)$_{12}$, and Ni(CO)$_4$. The amount of shell material included in the reaction mixture dictates the thickness of the shell layer and the size of the core-shell nanoparticle. Any particular ratio of core and shell material can be employed. In various exemplary embodiments, the ratio of core material to shell material is from about 10:1 to about 1:10. Such methods are applicable to preparation of other core-shell nanoparticle systems including, but not limited to, $Pt_3Co$@$Fe_2O_3$, PtCo@$Fe_2O_3$, $SmCo_5$@$Fe_2O_3$ and Co@$Fe_2O_3$, Pt@$Fe_2O_3$, FePt@Fe, $Pt_3Co$@Co@$Fe_2O_3$, Co@$Fe_2O_3$, and $MCo_5$@$Fe_2O_3$ (M=La, Ce, Pr or Nd). In further exemplary embodiments, the ratio of core material to shell material is from about 3:1 to about 1:5 or from about 1:2 to about 1:5. The reaction can be conducted for any suitable amount of time. In various exemplary embodiments, the reaction is conducted for from about 5 minutes to about 2 hours. In some such embodiments, the reaction is conducted for about 30 minutes. In various exemplary embodiments, the particles are then precipitated in a solvent such as alcohol and dispersed in a solvent such as an alkane.

Various exemplary embodiments of the present invention include methods for forming Co@Fe, Ni@Fe, Co@$Fe_xO_y$, Ni@$Fe_xO_y$, and Ag@$Fe_xO_y$ core-shell nanoparticles. Such methods include forming a core particle of Co, Ni, or Ag by the reduction of metal salts. For example, in forming an Ag core particle, AgNO$_3$ can be used. Alternatively, thermal decomposition of organometallic compounds such as Co$_2$(CO)$_8$ and silver trifluoroacetate can be employed. Following formation of the core, shell layers, such as layers of $Fe_2O_3$, are deposited on the nanoparticle core. In various exemplary embodiments, core-shell nanoparticles such as Pt@$Fe_3O_4$, Pt@FeO, Pt@Co and Pt@NiO are formed by forming a core particle of Pt and depositing shell layers of materials such as Co$_2$(CO)$_8$ or Ni(CO)$_4$ on the nanoparticle core. In still further embodiments, core-shell nanoparticles such as $SmCo_5$@$Fe_2O_3$ are formed by forming a core particle of SmCo$_5$ and depositing shell layers of materials such as Fe(CO)$_5$, and core-shell nanoparticles such as CoPt$_3$@Fe$_2$O$_3$ are formed by forming a core particle of CoPt$_3$ followed by depositing shell layers of materials such as Fe(CO)$_5$.

Various exemplary embodiments of this invention include methods for producing structurally and compositionally tunable nanoparticles using core-shell nanoparticles as single-source modulated reactants. Nanoparticles of well-defined shell-thickness and core-diameter, such as nanoparticles produced according to this invention, can be used, for example, as modulated precursors in the formation of alloy nanoparticles. For example: (i) core-shell metal-alloy nanoparticles having a small core and a thick shell can form alloy@metal or alloy@metal oxide core-shell nanoparticles; (ii) core-shell metal-alloy nanoparticles having a proper atomic ratio between core and shell can create pure alloy nanoparticles; and (iii) large core and thin shell nanoparticles can make metal@alloy or metal@alloy@metal oxide core-shell nanoparticles.

In various exemplary embodiments, the present invention includes methods of forming core-shell nanoparticles having cores sized from less than 1 mm to about 20 nm in diameter, and various ranges therein. For example, the methods according to this invention provide core-shell nanoparticles of from about 0.1 nm to 10 nm in diameter, from about 2 nm to about 20 nm in diameter, from about 1 to about 15 nm in diameter, from about 2 nm to about 12 nm in diameter, from about 4 to about 10 nm in diameter, from less than 1 nm to about 6 nm in diameter and from about 3.5 nm to about 5.4 nm in diameter are provided.

Various exemplary embodiments of the present invention include methods of forming magnetic alloy nanoparticles. Such methods can include transferring core-shell nanoparticles onto a proper substrate, such as a silicon wafer or a carbon-coated grid, and thermally annealing the combination of nanoparticles and substrate. When such annealing is conducted, the core and shell are reduced to a metal and then an alloy via solid state reactions between the two components. The overall diameters of the alloy particles remain substantially the same as the diameters of the core-shell nanoparticles before the thermal annealing process. Annealing can be conducted at from about 300° C. to at least 900° C. More suitable annealing temperatures include 350° C., 400° C., 450° C., 500° C., 550° C., 600° C., 650° C. and 700° C., as well as temperatures therebetween. In addition, annealing can be conducted in two or more stages at two or more temperatures within the above identified range.

In the case of Pt@Fe$_2$O$_3$, after thermal conversion at a suitable temperature of, for example, about 550° C., the particles can undergo ordering to a face-centered tetragonal structure (P4/mmm) indicative of L1$_0$ phase FePt. In such embodiments, the final FePt alloy can have magnetocrystalline anisotropy with coercivity of about 9.1 and about 7.0 kOe, at low (5 K) and high (300 K) temperatures, respectively. After thermal conversion at a suitable temperature of, for example, about 550° C., the particles can undergo ordering to a face-centered cubic structure of Fe$_3$Pt. The final Fe$_3$Pt alloy can have magnetocrystalline anisotropy at low temperatures (5 K) with coercivity of about 1.0 kOe. Also, after thermal conversion at a suitable temperature of, for example, about 550° C., the particles can undergo ordering to a face-centered cubic structure of FePt$_3$. The final FePt$_3$ alloy can have magnetocrystalline anisotropy at low temperatures (5 K) with coercivity of about 0.38 kOe. Different products are obtainable by varying Fe$_2$O$_3$ shell thickness and Pt core diameter.

More structurally and compositionally complex core-shell nanoparticles can be obtained by the methods according to this invention. For example, various Fe and Pt containing nanoparticles can be obtained. Such nanoparticles can be synthesized through modulation of the chemical composition ratios of, for example, Fe/Pt in Pt@Fe$_2$O$_3$ core-shell nanoparticles. Other more complex core-shell nanoparticles include, but are not limited to, FePt@Fe, Pt@FePt, Fe$_3$Pt@Fe, Pt@Fe$_3$Pt, Fe$_3$Pt@Pt, FePt$_3$@Fe, Pt@FePt$_3$, FePt@Fe$_3$Pt, Fe$_3$Pt@FePt, FePt@Fe$_x$Pt, Fe$_n$Pt$_m$@Fe$_x$Pt$_y$ and Fe$_n$Pt$_m$@Fe$_x$Pt$_y$@FeO$_z$ (where $0 \leq n, m, x, y, z \leq 100$ and $z=0,1, 1.33$ and $1.5$). Similarly, PtCo@CoO PtCo@CoFe and PtCo@Co nanoparticles can be obtained.

In various exemplary embodiments of the present invention, this modulated single nanoparticle reactant approach to synthesizing structurally and compositionally tunable core-shell nanoparticles can be used to produce both binary and ternary alloy nanoparticles including, but not limited to, FePt, Fe$_3$Pt, FePt$_3$, Fe$_x$Pt$_y$, CoPt, Co$_3$Pt, CoPt$_3$, Co$_x$Pt$_y$, CoFePt, Co$_x$Fe$_y$Pt$_z$, SmCo and SmCo$_5$ (where $1 \leq x, y, z \leq 100$).

Various exemplary embodiments of the present invention include exchange-coupled magnetic nanocomposite thin films produced from Pt@Fe$_2$O$_3$ core-shell nanoparticles, Pt$_3$Co@Fe$_2$O$_3$ core-shell nanoparticles, Co@Fe$_2$O$_3$ core-shell nanoparticles and SmCo$_5$@Fe$_2$O$_3$ core-shell nanoparticles. Some such embodiments include thin films and bulk forms of tetragonal phase FePt-containing nanocomposite. Such thin films can be synthesized, for example, through self-assembly and/or Langmuir-Blodgett (LB) depositions of core-shell nanoparticles. The core-shell nanoparticles described above and embodied in the present invention are particularly useful as single-source precursors for making nanocomposite films, powders and other bulk solids. Further, particular chemical compositions and nanostructures can be pre-modulated prior to particle assembly by using core-shell nanoparticles with appropriate core diameter and shell thickness. The Fe, Pt, Co and Sm containing core-shell nanoparticles according to this invention can serve as building blocks for nanocomposite films, powders and other bulk solids with various packing densities.

Various exemplary embodiments of the present invention include exchange-coupled magnetic nanocomposite bulk magnets produced from Pt@Fe$_2$O$_3$ core-shell nanoparticles by deposition of multiple layers using LB technique or self-assembly and thermal conversion at a suitable temperature (e.g., 450° C., 550° C. or 650° C.) under reducing/protecting gas such as hydrogen/argon and hydrogen/nitrogen.

In various exemplary embodiments of the methods of producing core-shell nanoparticles according to this invention, a nanoparticle metallic core is formed through the reduction of a metal salt, such as Pt(acac)$_2$, followed by the formation of a shell by controlled encapsulation of an organometallic compound, such as Fe(CO)$_5$. Such methods provide improved control over the chemical composition, size and structure of the resulting nanoparticles.

In various exemplary embodiments, core nanometer-sized particles of metal, such as platinum, are formed using a reducing agent in a solvent solution under inert gas. Shell layers of metal oxide can then be created, encapsulating the core particle. The resulting nanometer sized core-shell particles can then be purified and can be used as components for nanocomposite materials. Shell materials such as metals and metal oxides are chemically stable and easy to obtain. The sequential synthesis method according to this invention can be used with a variety of compounds to produce an assortment of different core-shell particles.

In various exemplary embodiments of the nanocomposite-forming methods according to this invention, homogenous thin layer films can be created using a single source nanoparticle. The core-shell, metal—metal oxide nanoparticles can be treated by a thermal annealing process, to reduce the metal oxide shell to metal, eventually forming tetragonal phase alloys. Such alloys have improved magnetic properties such as increased energy products.

In various exemplary embodiments, monodisperse Pt@Fe$_2$O$_3$ core-shell nanoparticles can be produced using a sequential synthetic method. For example, a mixture of 1,2 hexanediol (e.g., 90% tech. grade, Aldrich, 0.2 g or 0.75 mmol), oleic acid (e.g., 99+%, Aldrich, 40 μL or 0.125 mmol) and olelyamine (e.g., 70%, tech. grade, Aldrich, 40 μL or 0.125 mmol) in octyl ether (e.g., 99%, Aldrich, 1.5 mL) is added into a flask (e.g., a 15 mL three-neck round-bottom flask) under inert gas flow (e.g., Argon) and heated to reflux (e.g., at a temperature of 290° C. using a heating mantle). Platinum acetylacetonate (Pt(acac)$_2$) (e.g., 99.99%, Aldrich, 0.1 g or 0.25 mmol) in octyl ether (e.g., 1 mL) is then injected into the mixture at this temperature. The color of the reaction solution immediately turns black, indicating the spontaneous formation of nanoparticles. The reaction continues for an additional 5 minutes, and the solution is then cooled to 220° C.

Iron pentacarbonyl (Fe(CO)$_5$) (e.g., 99.999%, Aldrich) is then added using a microsyringe, and the temperature of the reaction is raised (e.g., to 290° C.). The solution refluxes at this temperature for a designated period of time (e.g., about 5 minutes to about 2 hours) and is then cooled to room temperature. After this reaction, the nanoparticles are separated from the mixture by washing with hexane, precipitating with ethanol and centrifuging (e.g., at 5000 rpm for about 5 min) in ambient conditions. This washing procedure is repeated twice. The final product is dispersed in hexane with a small amount of excess oleic acid.

In various exemplary embodiments, monodisperse Pt$_3$Co@Fe$_2$O$_3$ core-shell nanoparticles can be produced using a sequential synthetic method. For example, cobalt carbonyl (Co$_2$(CO)$_8$) (e.g., 50 mg) is added to diphenyl ether (e.g, 0.5 mL). A mixture of 1,2-hexadecanediol (e.g., 140 mg), platinum acetylacetonate (e.g., 40 mg), diphenyl ether (e.g., 2 mL), hexadecylamine (e.g., 4 g) and 1,2 adamantanecarboxylic acid (e.g., 90 mg) can be added to a flask (e.g., a 15 mL three-neck round-bottle flask) under inert gas flow (e.g., argon). The mixture is heated (e.g., to 160° C. at a rate of 5° C./min). The solution of Co$_2$(CO)$_8$ in diphenyl ether is quickly injected into the flask, which results in rapid formation of a black suspension, indicating the generation of nanoparticles. The solution was heated to reflux temperature (e.g., 260–270° C.) and that temperature was maintained (e.g., for 40 minutes). After the reaction, the solution is cooled (e.g., to 170–180° C.), and Fe(CO)$_5$ (e.g., 30 μL) is injected slowly into the reaction mixture. After heating to reflux (e.g., for an additional 30 minutes) the solution is cooled to room temperature. Size selection separation is conducted using solvents and centrifuging. The final product is stored in chloroform with a small amount of oleic acid.

In various exemplary embodiments, monodisperse SmCo$_5$@Fe$_2$O$_3$ core-shell nanoparticles can be produced using a sequential synthetic method. For example, Sm(acac)$_3$.xH$_2$O (e.g., 0.030 g) is preheated under vacuum (e.g., in three-neck 15 mL flask in an oil bath at a temperature of 110° C.). After maintaining vacuum for a period (e.g., 40 minutes), a mixture of oleic acid (e.g., 60 μL), 1,2-hexadecanediol (e.g., 0.1 g), 99% trioctylphosphine oxide (TOPO) (e.g., 0.2 g) and octyl ether (e.g., 3 mL) is added. Cobalt carbonyl (Co$_2$(CO)$_8$) (e.g., 0.1 g) is dissolved in octyl ether (e.g., 0.5 mL). The oleic acid mixture is slowly heated (e.g., to 150° C. with a heating mantle) and the Co$_2$(CO)$_8$ solution is quickly injected. The color of the mixture shows dark green color when the Co$_2$(CO)$_8$ solution is injected and changes to dark black upon heating (e.g., to a temperature of between 190° C. and 200° C.). The mixture is further heated (e.g., to 250° C.) and temperature is maintained (e.g., for 30 minutes). The mixture is cooled (e.g., to 160° C.) and Fe(CO)$_5$ (e.g., 30 μL) is injected. The mixture was then heated (e.g., to 240° C. for 30 minutes). 200 μL of the product mixture was transferred into a 2 mL vial. Size selection separation is conducted using solvents and centrifuging. The final product is stored in hexane with a small amount of oleic acid.

In various exemplary embodiments, long chain 1,2-diols other than 1,2-hexanediol can be used to reduce the metal salt to nanoparticles. Such alternative long chain 1,2-diols include, but are not limited to, 1,2-octanediol, 1,2-decanediol, 1,2-dodecanediol, ethylene glycol, etc., and mixtures thereof.

Oleic acid acts as a stabilizing ligand in the above process. It is known to stabilize cobalt and iron nanoparticles. In various exemplary embodiments, other similar long chain carboxylic acids including, but not limited to, erucic acid, linoleic acid, and mixtures thereof are used. Additional long chain primary amine-based ligands such as olelyamine are included to protect the surface of the platinum particles. In various exemplary embodiments, other amine-based ligands including, but not limited to alkyl amine RNH$_2$, where R is an alkyl group of at least 8 carbon atoms are used.

Preferred solvents include phenylether and octylether. However, any suitable solvent in which constituent metals have good solubility and which have an appropriate boiling point can be used. Other suitable solvents include, but are not limited to, dichlorobenzene. In various exemplary embodiments, the reaction is carried out at temperatures ranging from about 150° C. to about 300° C., depending on the solvent used. Preferred reaction temperatures range from about 220° C. to about 300° C. However, higher or lower temperatures can be used, as desired.

To produce Pt@Fe$_2$O$_3$ core-shell nanoparticles, platinum salts such as Pt(CH$_3$COCHCOCH$_3$)$_2$, Pt(CF$_3$COCHCOCF$_3$)$_2$, Pt(O)(triphenylphosphine)$_4$(CO)$_x$, can be used. Organometallic compounds such as Fe(CO)$_5$, Fe$_2$(CO)$_9$, Fe$_3$(CO)$_{12}$, Fe(CH$_3$COCHCOCH$_3$)$_3$, Co$_2$(CO)$_8$, CO$_4$(CO)$_{12}$, Co(CH$_3$COCHCOCH$_3$)$_2$, Sm(CH$_3$COCHCOCH$_3$)$_3$, and Ni(CO)$_4$ can be used.

The method can be used to produce other core-shell nanoparticles, such as Pt@Co Pt@CoO, PtCo@CoO, Pt$_3$Co@Co, Pt$_3$Co@CoO, Pt$_3$Co@Co@ Fe$_2$O$_3$ and Pt@NiO. Thus, the method also encompasses the use of organometallic compounds such as Co$_2$(CO)$_8$, Co$_4$(CO)$_{12}$, Ni(CO)$_4$, Co(η$^3$-C$_8$H$_{13}$)(η$^4$-C$_8$H$_{12}$) and other metal carbonyls. The synthetic method could also be used to produce nanoparticles of Au@M (where M can be, for example, Ag, Cd, In, Pb, Pd, Pt, Tl and Sn); Pt@M (where M can be, for example, Ru, Pd); M@Pt (where M can be, for example, Ag, Pd and Ru); Ag@M (where M can be, for example, Cd and Pb).

Figure 1B:
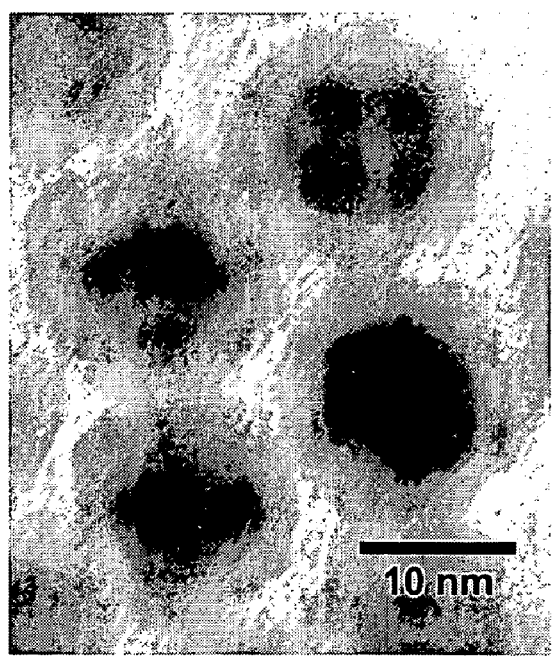
FIG. 1(b) is a high magnification TEM micrograph of exemplary core-shell nanoparticles according to this invention.

In FIGS. 1(a) and 1(b), the particle size and distribution of exemplary Pt@Fe$_2$O$_3$ core-shell nanoparticles are shown using TEM image analysis. To produce the images, a nanoparticle solution was spread on a carbon coated copper substrate and the solvent allowed to evaporate. Low-magnification TEM images were recorded on a JEOL JEM 2000EX microscope at an accelerating voltage of 200 kV. High-magnification TEM images and compositional analysis of single nanoparticles were obtained using a FEI CM20 analytical electron microscope (AEM) equipped using an EDAX energy dispersive unit. The exemplary core-shell nanoparticles were made using $Pt(acac)_2/Fe(CO)_5$ at a mole ratio of 1:2. The nanoparticles shown in FIG. 1(a) are relatively monodisperse, and the core and shell are easily distinguishable. The dark cores have an average diameter of about 10 nm and possess well-defined crystalline facets with morphologies indicative of cubic phase platinum nanoparticles. The high magnification TEM images in FIG. 1(b) show that the average shell thickness of these nanoparticles is about 3.5 nm.

Figure 2:
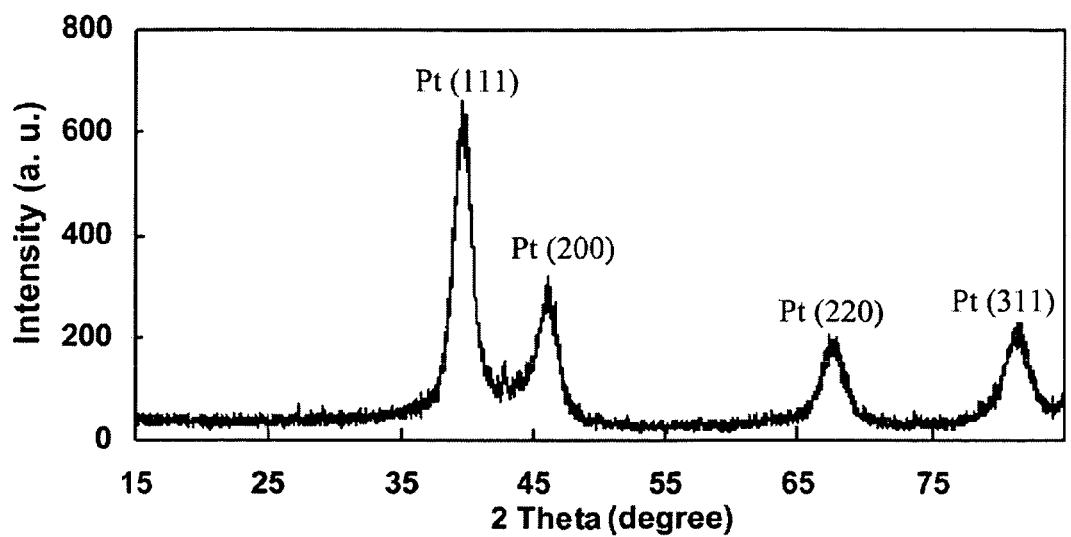
FIG. 2 is a graph showing PXRD spectra of exemplary core-shell nanoparticles according to this invention.

In FIG. 2, the crystalline structures of exemplary exemplary $Pt@Fe_2O_3$ core-shell nanoparticles were analyzed using PXRD. The PXRD spectra were recorded on a Philips MPD diffractometer with a Cu Kα (1,5405 Å) X-ray source. The x-ray diffractions at 39.8°, 46.3°, 67.5° and 81.3° 2θ can be indexed to (111), (200), (220) and (311) planes of cubic phase platinum (Fm3m) respectively (JCPDS database-International Centre for Diffraction Data, 1999, PCPDFWIN v. 2.02). The diffraction patterns of the nanoparticles in FIG. 2 are relatively broad, most likely due to the small sizes of the nanoparticles.

Figure 3A:
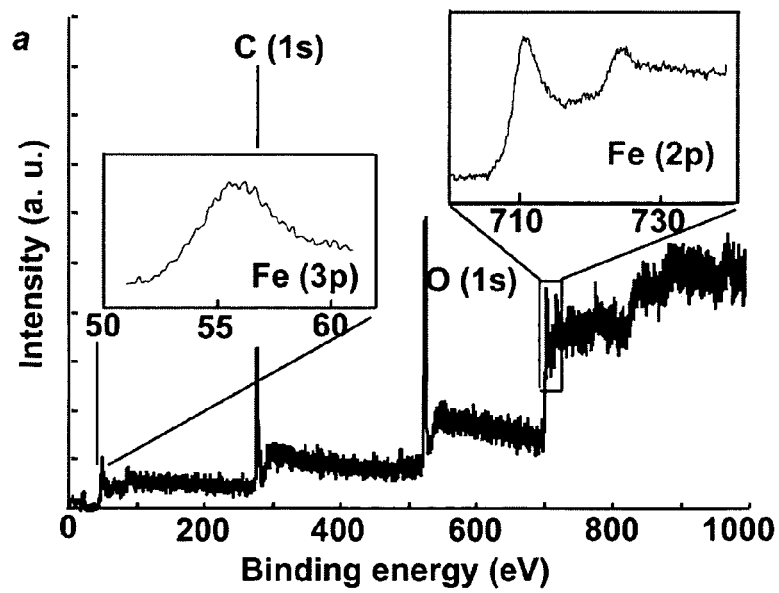
FIGS. 3(a) and 3(b) are graphs showing XPS spectra of exemplary core-shell nanoparticles according to this invention.

It is known that PXRD is not an ideal method to characterize certain crystalline forms of iron-containing nanoparticles, such as $\gamma$-$Fe_2O_3$ (cubic maghemite) and $Fe_3O_4$ (magnetite), because they both possess the inverse spinel structure and can have similar PXRD patterns. Thus, XPS can be used to examine shell structure of nanoparticles, because core electron lines of ferrous and ferric ions can both be detected and distinguished in XPS. FIG. 3(a) shows representative XPS spectra of exemplary oleic acid-stabilized $Pt@Fe_2O_3$ core-shell nanoparticles. The photoelectron peaks detected at 710.9 and 724.9 eV are the characteristic doublet of Fe $2p_{3/2}$ and $2p_{1/2}$ core-level spectra of iron oxide, respectively (inset). A relatively weak Fe 3p line at 55.9 eV is also shown. Both Fe 2p and 3p data match closely with those of $Fe_2O_3$ reported in the literature.

Figure 3B:
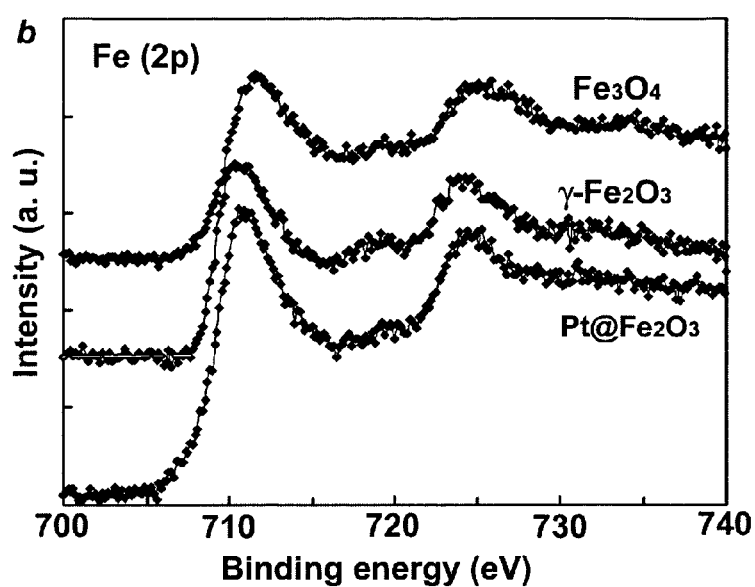

To confirm the oxidation state of iron oxide shells, references of $Fe_3O_4$ (98%, powder, <5 micron, Aldrich) and $\gamma$-$Fe_2O_3$ (99.9%, Aldrich) powders can be run under the same conditions as those for the exemplary $Pt@Fe_2O_3$ core-shell nanoparticles. FIG. 3(b) shows the Fe 2p XPS spectra of both the two references and the core-shell nanoparticles. The XPS signals of exemplary $Pt@Fe_2O_3$ core-shell nanoparticles matches well with those of $\gamma$-$Fe_2O_3$ and differs from those of $Fe_3O_4$ by about 1 eV. No metallic iron signals can be detected in the XPS spectra, suggesting that $Fe(CO)_5$ decomposition accompanies the oxidation of iron either during the high-temperature reaction and/or the subsequent steps.

Analysis by TEM, PXRD and XPS illustrates that platinum is not present in the shell layer of exemplary $Pt@Fe_2O_3$ core-shell nanoparticles according to this invention since the detectable X-ray photoemission comes from the atoms in layers beneath the examined surfaces with a depth of about 3–5 nm. Observable core-level XPS spectra of C 1s (287 eV) and O 1s (531 eV) correspond to oleic acid and iron oxide.

Figure 4:
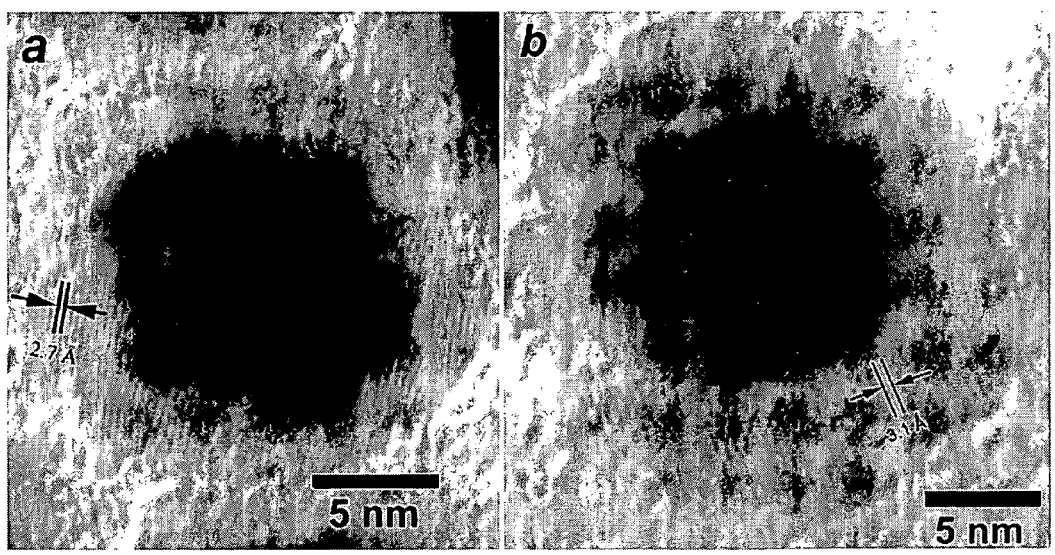
FIGS. 4(a) and 4(b) are high-resolution TEM micrographs of exemplary core-shell nanoparticles according to this invention.

Fine structures of shell layers of exemplary $Pt@Fe_2O_3$ core-shell nanoparticles according to this invention can be further illustrated using high-resolution TEM. FIGS. 4(a) and 4(b) show representative TEM images of exemplary $Pt@Fe_2O_3$ core-shell nanoparticles according to this invention that focus on the crystalline structures of the shells of the nanoparticles. The shell layers, thin enough to be studied directly by TEM, typically have the same types of fringes running directly from the platinum crystalline surfaces. The fringes shown in FIGS. 4(a) and 4(b) have a spacing of about 2.7 Å and about 3.1 Å, which match closely to (221) and (220) planes of $\gamma$-$Fe_2O_3$ (cubic maghemite, $P4_232$), respectively.

One distinct advantage in the present inventive synthetic approach is that the present method can make core-shell nanoparticles via a "one-pot" stepwise process. In this invention, platinum precursors are first reacted at reflux temperature to form metal cores, which is followed by the addition of iron pentacarbonyl at a suitable concentration in the same reaction vessel. This two-step route allows the shell thickness of the core-shell nanoparticles to be manipulated in a controlled manner. The ease of thermodecomposition of $Fe(CO)_5$ in hot organic solvents offers an additional advantage of making iron-containing species on preformed platinum nanoparticles in situ. By changing the initial concentration of $Fe(CO)_5$, different shell thicknesses can be achieved for $Pt@Fe_2O_3$ core-shell nanoparticles.

Figure 5A:
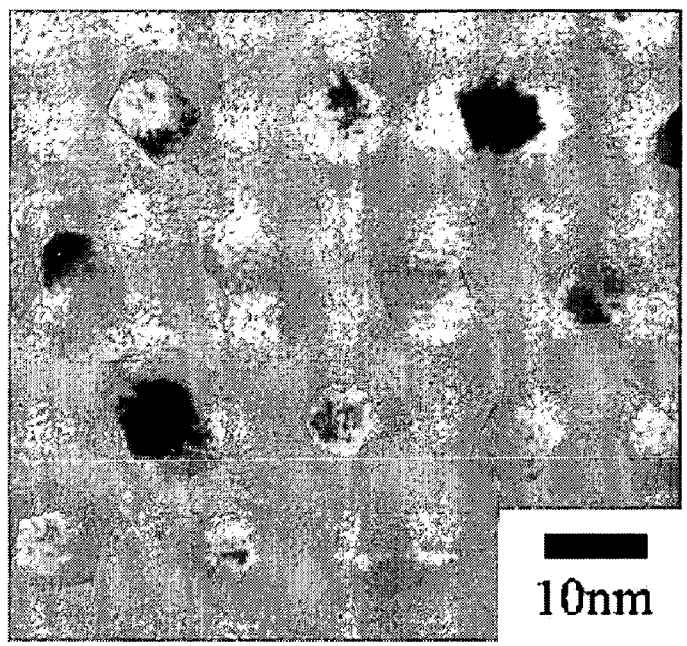
FIGS. 5(a) and 5(b) are TEM micrographs of exemplary core-shell nanoparticles according to this invention.
Figure 5B:
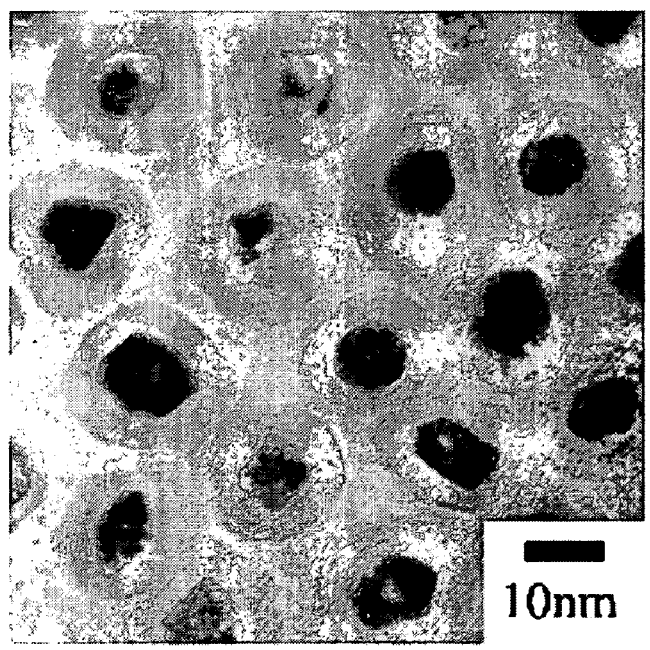

FIGS. 5(a) and 5(b) show TEM images of several exemplary $Pt@Fe_2O_3$ core-shell nanoparticles according to this invention. The several nanoparticles can be obtained by injecting different amounts of $Fe(CO)_5$ into reaction flasks immediately after Pt nanoparticles (about 10 nm) are formed. The nanoparticles shown in FIG. 5(a) have an average shell thickness of about 3.5 nm and can be made with an $Fe(CO)_5$ final concentration of 0.2 mM. By increasing the final concentration of $Fe(CO)_5$ to 0.4 mM, the $Fe_2O_3$ shells can be produced at a size of about 5.4 nm, as shown in FIG. 5(b).

$Pt@Fe_2O_3$ core-shell nanoparticles according to this invention can be converted into FePt-containing nanoparticles. The iron oxide shells of the nanoparticles can be reduced with 5% hydrogen/95% argon forming gas and react with the Pt cores at temperatures ranging from about 400 to 550° C. In various exemplary embodiments, core-shell particles are transferred onto a carbon-coated grid and converted under a flow of forming gas of Ar (95%) and $H_2$ (5%) at 550° C. for 2 hours. The iron oxide is reduced into iron and platinum at the enhanced temperature.

Figure 6A:
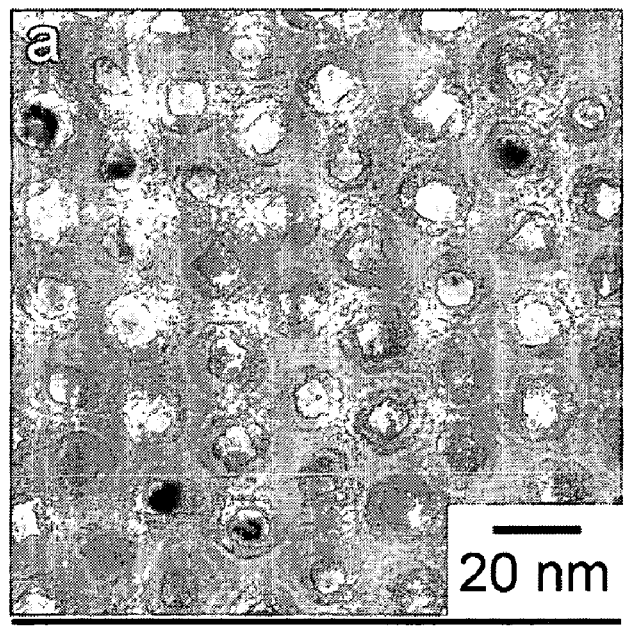
FIGS. 6(a) and 6(b) are TEM micrographs of exemplary core-shell nanoparticles according to this invention.
Figure 6B:
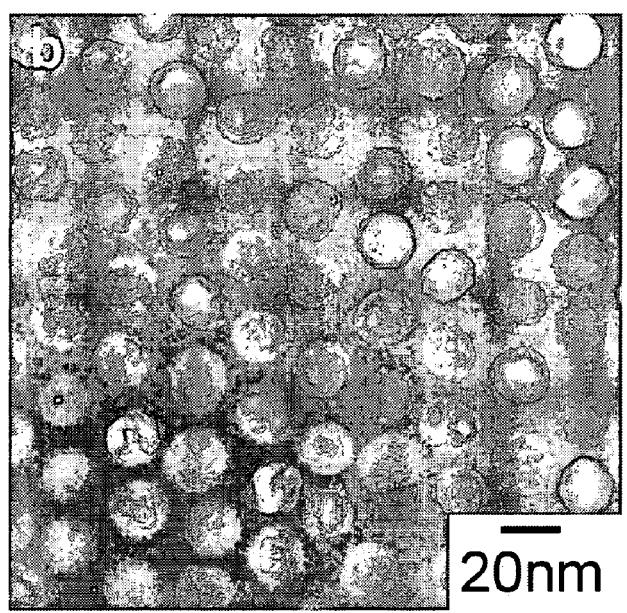

FIG. 6(a) shows a TEM image of exemplary $Pt@Fe_2O_3$ core-shell nanoparticles according to this invention that have Pt cores with an average diameter of about 10 nm and $Fe_2O_3$ shells of about 3 nm. The cores (Pt) and shells ($Fe_2O_3$) can be clearly distinguished because of their large difference in electron density. FIG. 6(b) shows a TEM image of exemplary nanoparticles after thermal conversion. The shell layers of $Pt@Fe_2O_3$ nanoparticles disappear suggesting the formation of a new alloy material. The overall diameters of the final products are, however, essentially the same as the core-shell nanoparticles before the thermal process.

Figure 7:
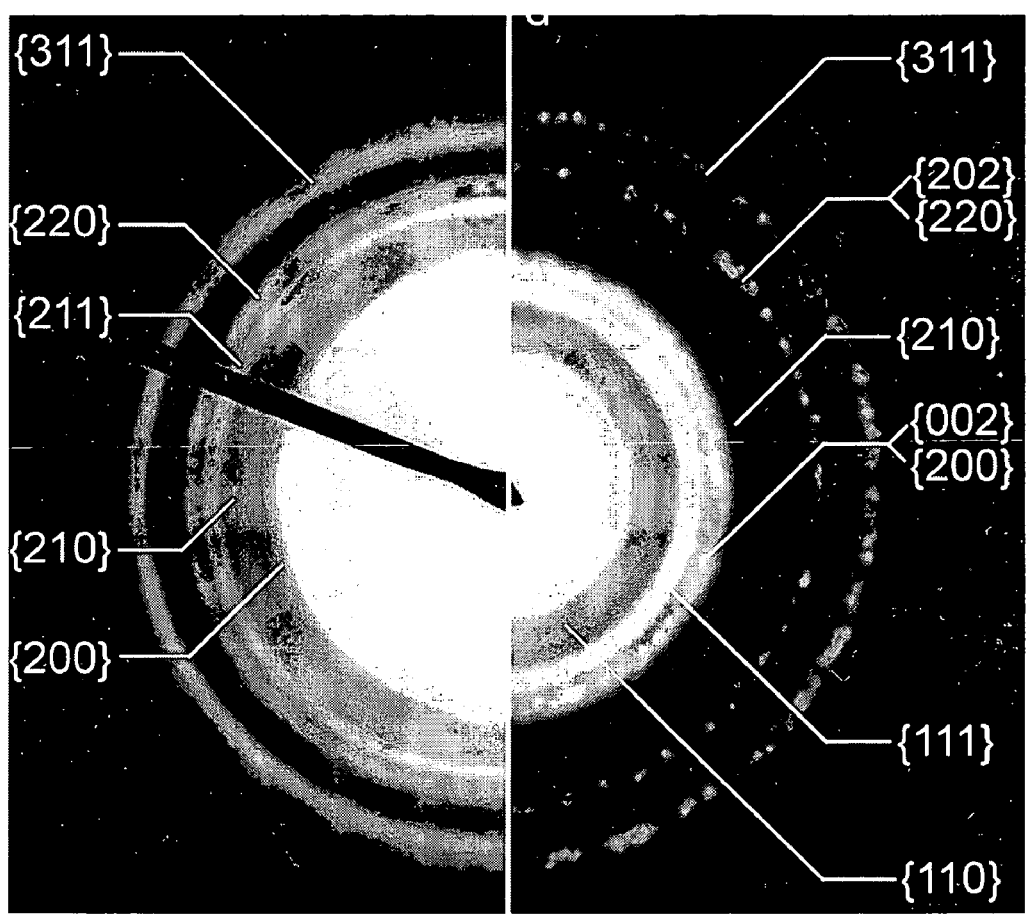
FIG. 7 is an SAED image of exemplary core-shell nanoparticles according to this invention.

FIGS. 7(a) and 7(b) show the SAEDs of exemplary $Pt@Fe_2O_3$ core-shell nanoparticles according to this invention and exemplary final alloy nanoparticles after conversion of the nanoparticles. The ring patterns shown in FIG. 7(a) belong to cubic phase platinum metal (the core) (Fm3m), and those in FIG. 7(b) can be assigned to face-centered tetragonal phase FePt alloy (P4/mmm). The difference of electron diffractions between {002} and {200} planes in ordered FePt $L1_0$ phase is small and overlapped, which is also true for {220} and {202} planes. The narrower and more discrete SAED patterns in the final alloy products indicates increased crystallinity in the final particles compared to the original core-shell nanoparticles.

Figure 8:
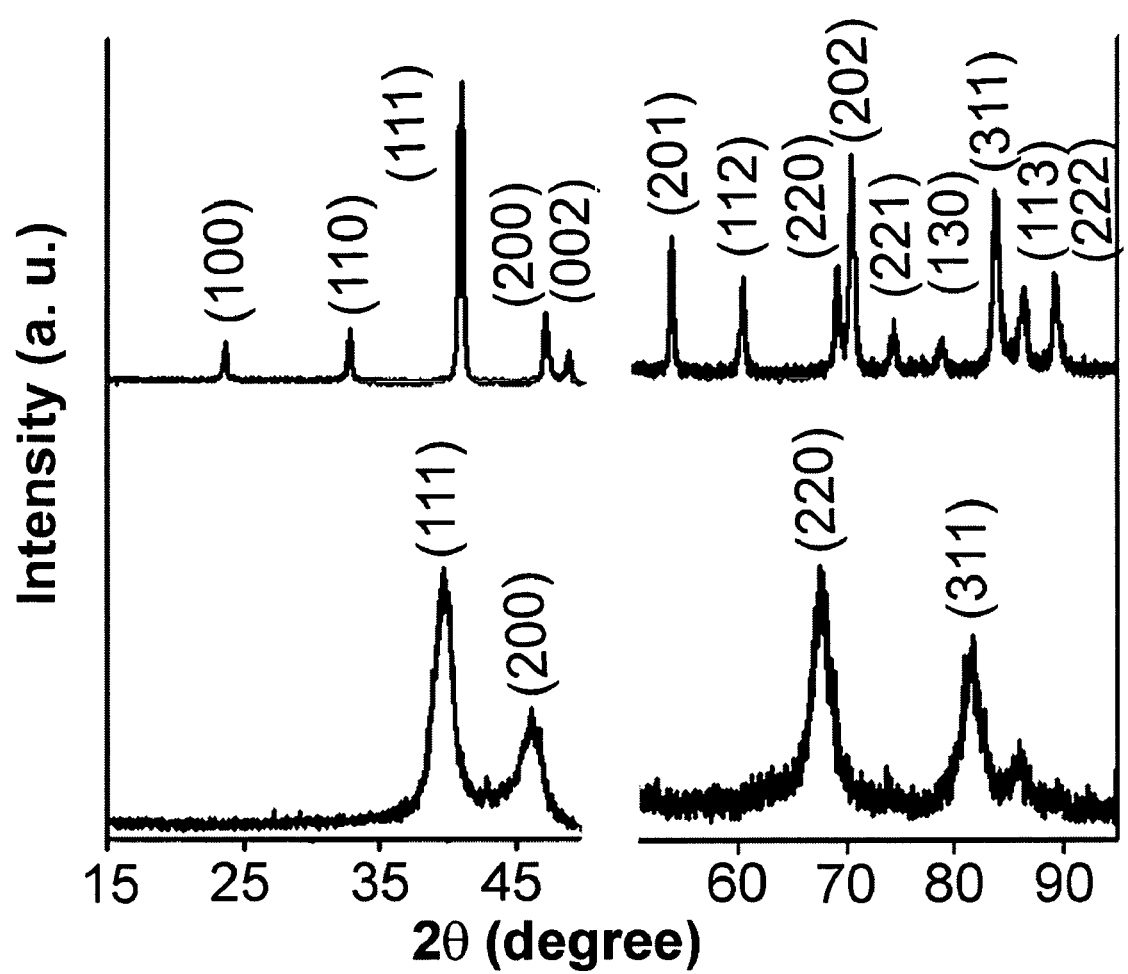
FIG. 8 is a graph showing PXRD spectra for exemplary core-shell nanoparticles according to this invention.

FIGS. 8(a) and 8(b) show PXRD spectra of (a) exemplary Pt@Fe$_2$O$_3$ core-shell nanoparticles according to this invention and (b) exemplary FePt alloy products obtained by thermal conversion of the core-shell nanoparticles. FIG. 8(a) shows diffraction at 39.8°, 46.3°, 67.5° and 81.3° 2θ, which can be indexed to the (111), (200), (220) and (311) plane of cubic platinum (Fm3m), respectively. After conversion at 550° C., as shown in FIG. 8(b), the four PXRD peaks shift to 41.1°, 47.1°, 68.9° and 83.4° 2 θ, respectively. New diffractions that match very well with the characteristic peaks belonging to planes of face-centered tetragonal phase iron platinum alloy (P4/mmm) such as (002) and (202), also appear. The PXRD of FePt alloy nanoparticles has much narrower peak widths than those of core-shell nanoparticles which could be largely due to the increased crystallinity of the final FePt products. The observed PXRD and SAED patterns confirm that the converted core-shell nanoparticles are L1$_0$ phase FePt.

One advantage of the present invention is that the synthesis method allows for the controlled formation of core-shell nanoparticles designed to have varying core-diameter and shell-thickness. The structure and composition of the nanoparticles can be modulated by the amount of reactants, in particular, the molar amount of metal salt and organometallic compound. The nanoparticle structure and composition can also be controlled by other reaction parameters such as the reaction time and temperature, and the stabilizers and surfactants included in the reaction. Core-shell nanoparticles of various structures can then serve as precursors to an assortment of metal alloy nanoparticles with the desired chemical and magnetic properties.

Figure 9:
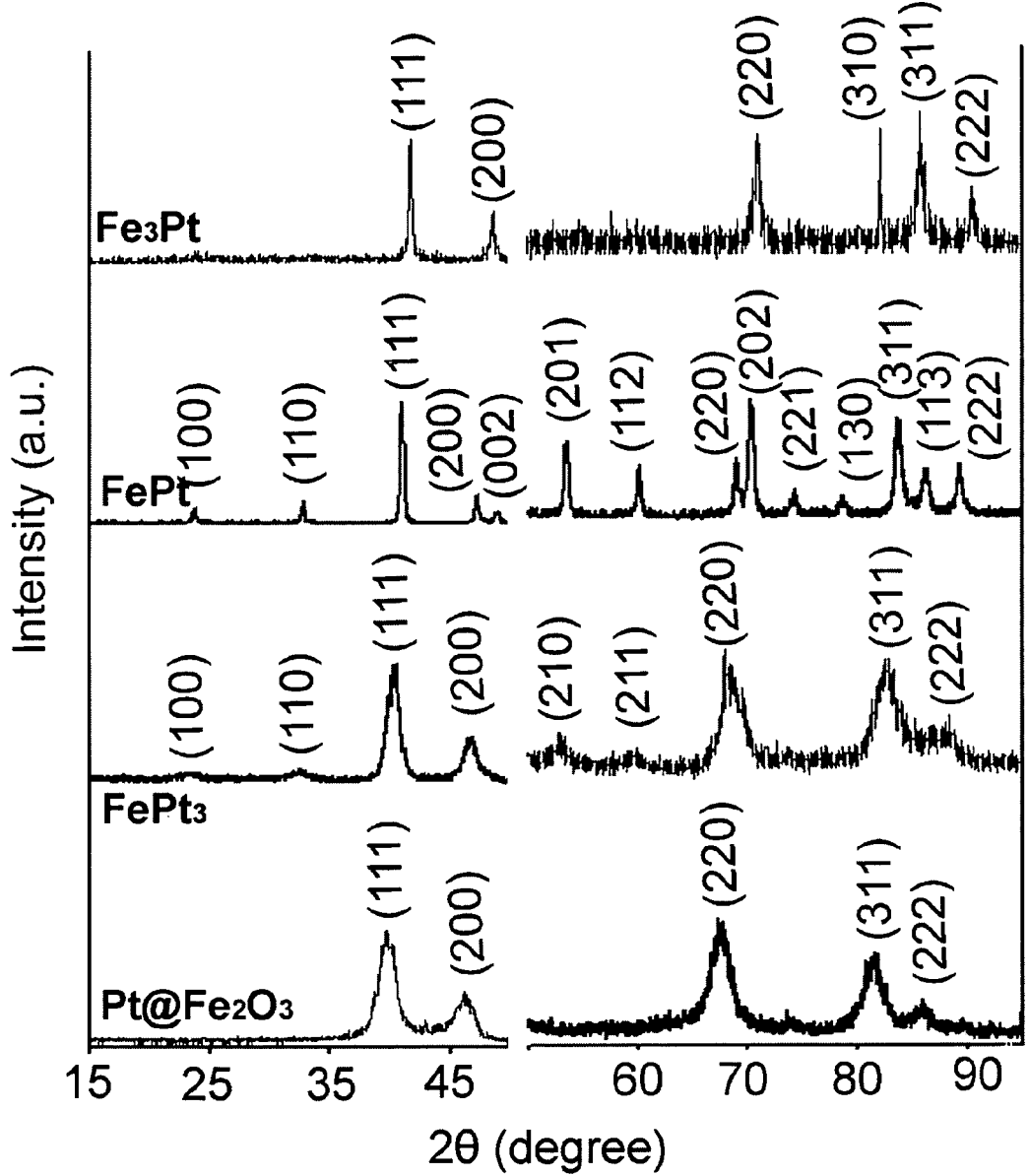
FIG. 9 is a graph showing PXRD spectra for exemplary core-shell nanoparticles according to this invention.

FIG. 9 shows PXRD spectra of exemplary Fe/Pt alloys produced using exemplary core-shell nanoparticles according to this invention. Among the exemplary Fe/Pt alloys, diffraction patterns indexing to planes indicative of cubic platinum (Fm3m) are obained. Diffraction peaks that match with the characteristic peaks belonging to planes of a face-centered cubic phase structure of Fe$_3$Pt and diffraction peaks that match with the characteristic peaks belonging to planes of a face-centered cubic phase structure of FePt$_3$ are shown in FIG. 9.

Conversion of closely packed synthetic core-shell nanoparticles can lead to the formation of thin films of FePt alloy. One of the unique aspects of using core-shell based nanoparticles for nanocomposite films lies in the fact that the particles are single-source precursors and therefore, could potentially eliminate the needs for homogenous mixing of two or more types of particles. A further unique aspect is that the required chemical compositions and nanostructures can be pre-modulated prior to particle assembly by using core-shell nanoparticles with appropriate core-diameter and shell thickness. The core-shell nanoparticles can be assembled into thin films using controlled deposition methods, such as Langmuir-Blodgett (LB) and Langmuir-Schaffer techniques. In particular, LB enables fine control of thickness, particle density and homogeneity of monolayer, and ease of multilayer deposition.

The LB technique is suitable for producing large areas of polydisperse and monodisperse nanoparticles. In various exemplary embodiments, LB films of γ-Fe$_2$O$_3$ nanoparticles can be made using a KSV 3000 Langmuir trough in a Class 10000 clean room. The surface pressure can be monitored using a Wilhepy plate method. Nanoparticles can be suspended in hexane (e.g., 800–1000 μL) and spread at the air-water (Barnstead Nanopure II, 16.7 MΩ) interface using a microsyringe. After the hexane evaporates (e.g., <5 min), compression of the film can be performed at a rate of 10 mN/(m min). LB films can be prepared at surface pressures ranging from about 30 to about 65 mN/m and lifted onto solid substrates such as silicon wafer or poly(dimethlysiloxane) stamp (PDMS) at a rate of about 5 mm/min. Monolayer deposition can be performed with substrates submerged in water prior to spreading.

Figure 10:
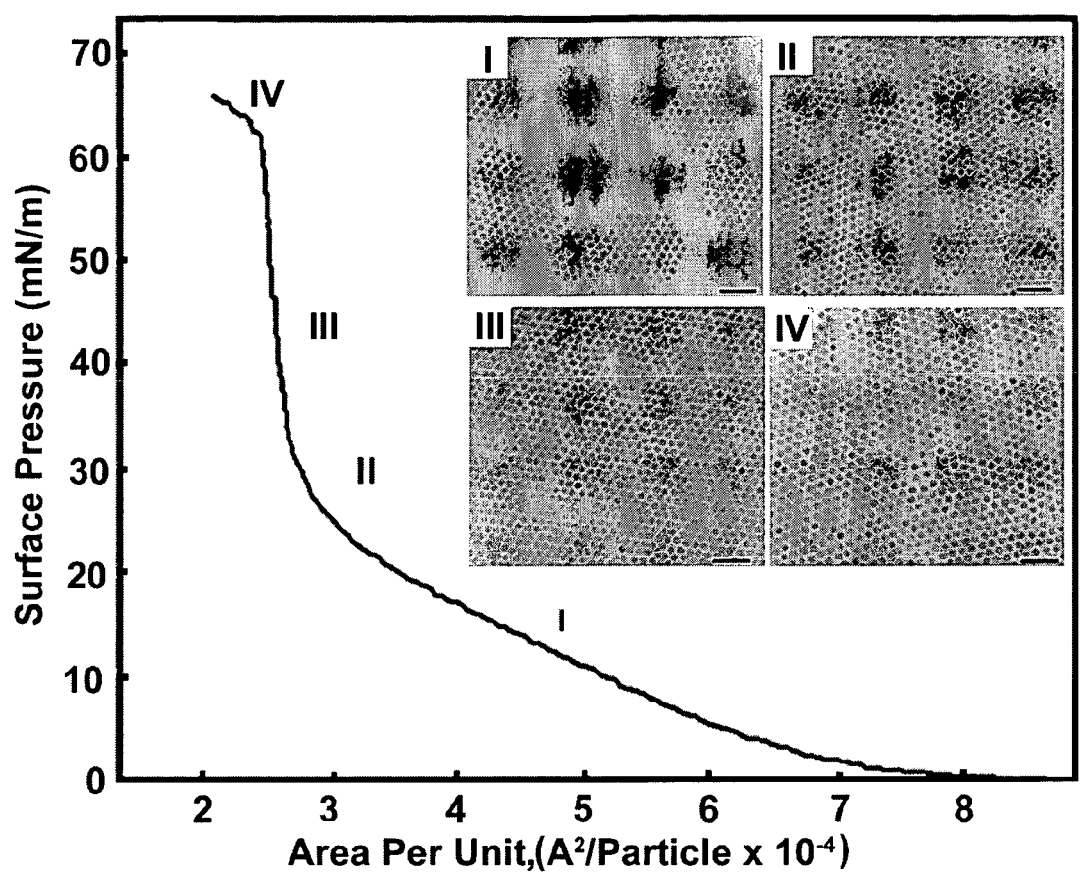
FIG. 10 is an isotherm diagram for exemplary nanocomposite materials according to this invention.

FIG. 10 shows an isotherm of surface pressure vs. area (π-A) for monodisperse nanoparticles of γ-Fe$_2$O$_3$ and TEM images of LB films at four different compression pressures. At low surface pressure (about 15 mN/m), nanoparticles are packed in patches connected randomly with large spaces. In each individual patch, nanoparticles are highly ordered and form hexagonal close-packed (hcp) structure. This ordered structure is very different from those LB films made of polydisperse particles and most likely is due to the monodispersity of the nanoparticles. This Langmuir film can be compressed into close-packed domains with diminishing void spaces at increasing surface pressure. Very high compressing pressure (about 65 mN/m) can be achieved for the γ-Fe$_2$O$_3$ monolayer. Complete coverage of the substrate by magnetic nanoparticles can be readily achieved with double layered LB films. It is feasible that Pt@Fe$_2$O$_3$ core-shell nanoparticles can be compressed at equally high pressure since the surface properties of the particles are similar to those of monodisperse nanoparticles of γ-Fe$_2$O$_3$.

Figure 11:
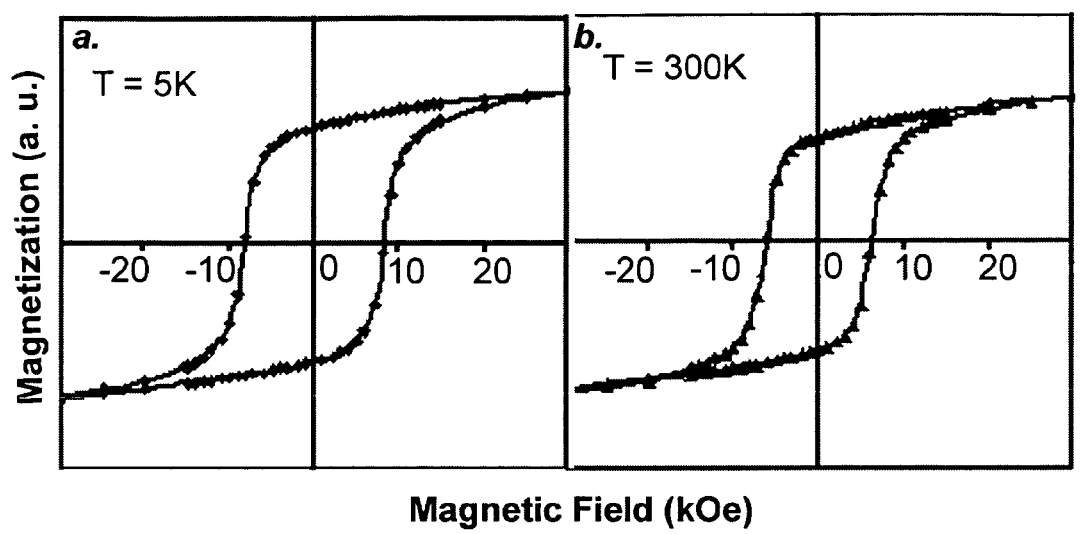
FIG. 11 is a graph showing M–H curves for nanocomposite materials according to this invention.

The magnetic properties of exemplary FePt alloy nanostructures on silicon wafers can be examined using a Quantum Design AC and DC Superconducting Quantum Interface Device (AC/DC SQUID; model: MPMS XL) magnetometer. FIG. 11 shows the M-H curves of exemplary FePt alloys at (a) 5 K and (b) 300 K. The M-H measurement of such exemplary materials shows a characteristic hysteresis loop for ferromagnetic materials. The coercivity at low (5 K) and high (300 K) temperatures are 9.1 and 7.0 kOe, respectively.

Figure 12:
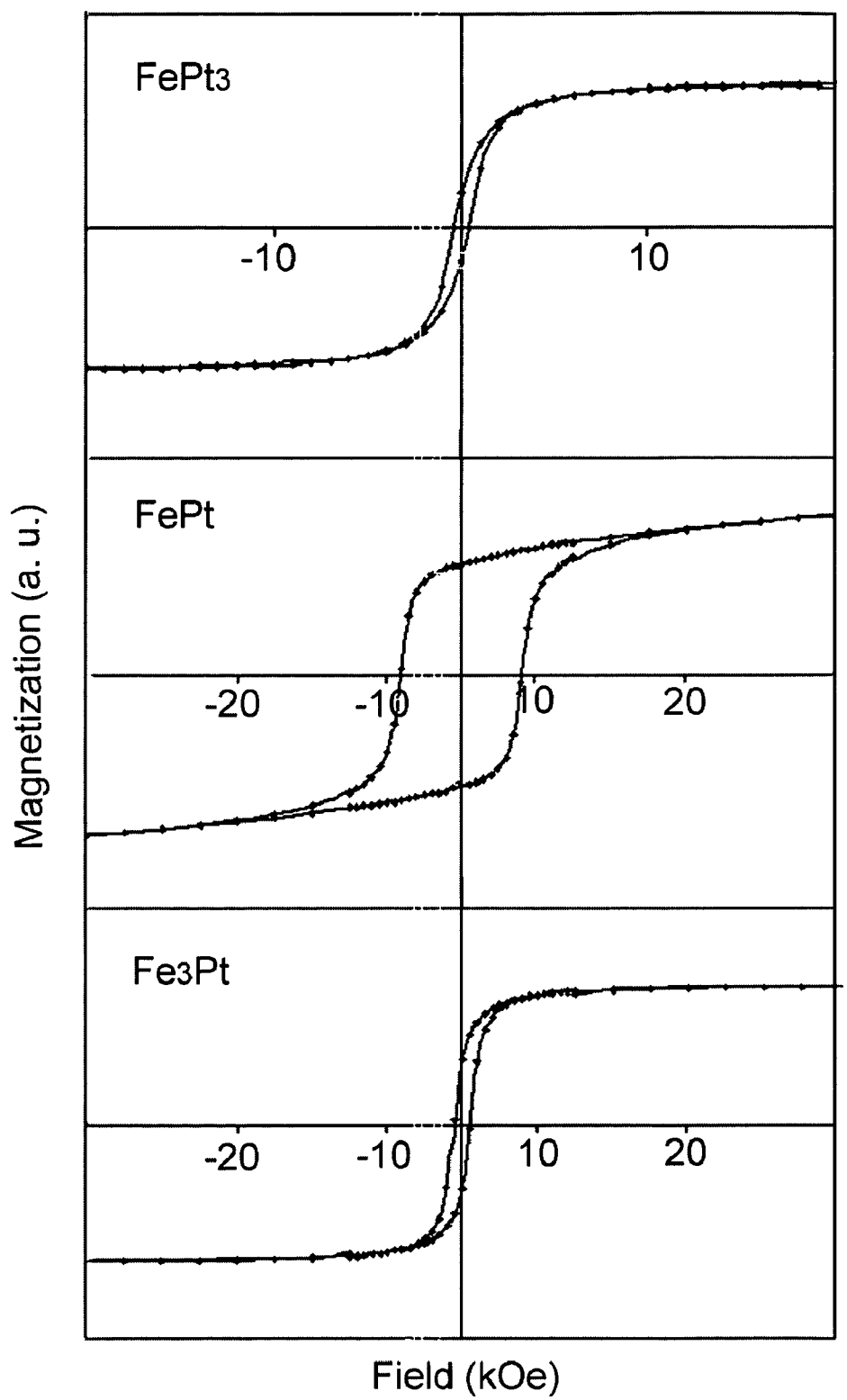
FIG. 12 is a graph showing M–H curves for nanocomposite materials according to this invention.

FIG. 12 shows the M-H curves of the exemplary Fe/Pt alloys at 5 K. M-H measurements on each exemplary alloy show the hysteresis loop characteristic of ferromagnetic materials. The FePt$_3$ and Fe$_3$Pt alloys display a coercivity at 5 K of 0.38 kOe and 1.0 kOe, respectively. FePt has a coercivity value at 5 K of 9.1 kOe.

This invention is illustrated by the following examples, which are merely for the purpose of illustration.

EXAMPLE 1

Synthesis of Face-Centered Tetragonal (fct) FePt in Film and Bulk Forms from Pt@Fe$_2$O$_3$ Core-Shell Particles (10 nm Pt Core and ~3.5 nm Fe$_2$O$_3$ Shell) at 550° C.

Obtaining Pt@Fe$_2$O$_3$ core-shell particles. A mixture of 1,2-hexadecanediol (200 mg), octyl ether (2.5 mL), oleic acid (120 μL) and oleylamine (80 μL) was added to a 15 mL three-neck round-bottle flask under argon protection. The resulting solution was heated to 290° C. at a rate of 5° C./min and refluxed at this temperature. 100 mg platinum acetylacetonate and 1 mL octyl ether mixture were quickly injected into the reaction solution. The solution began to turn black indicating the formation of Pt nanoparticles. The solution was kept at reflux temperature for 10 minutes, then cooled to 150° C. when 55 μL Fe(CO)$_5$ were slowly injected into the solution. After injecting Fe(CO)$_5$, the solution was heated to reflux temperature and maintained at reflux temperature for 30 minutes. After the reaction, size selection separation was performed using hexane and ethanol. Subsequently, conversion was conducted in Ar and H$_2$ (5 v/v %) forming gas. 200 μL of the product mixture were transferred into a 2 mL vial and 1.8 mL ethanol were added to induce precipitation of nanoparticles. The nanoparticles were separated from solvent by centrifuging at 5000 rpm for 5 min. Yellow-brown supernatant was discarded and the black precipitated nanoparticles were recovered by suspending the nanoparticles in 0.5 mL hexane in the presence of 10 µL oleic acid. 1.5 mL ethanol were added and the suspension, which was centrifuged to precipitate the nanoparticles. The nanoparticles were then dispersed in 1.5 mL of hexane. After centrifuging, the transparent supernatant was collected and the precipitate discarded. The final product was stored in hexane.

Converting Pt@$Fe_2O_3$ core-shell particles into fct FePt film. 0.5 mL Pt@$Fe_2O_3$ particles in a 10 mg/mL hexane solution were slowly drop-cast onto a Si wafer under a fume hood. Hexane was allowed to evaporate. The wafer was transferred to a tube furnace and annealed under a flow of $H_2$ (5 v/v %) in Ar at 550° C. for 2 hours. The annealing was conducted by preheating at room temperature for 10 minutes, heating to 350° C. at a rate of 150° C./h and maintaining temperature for 2 hours, heating to 550° C. at a rate of 100° C./h and maintaining temperature for 2 hours, and cooling naturally to room temperature.

Figure 13A:
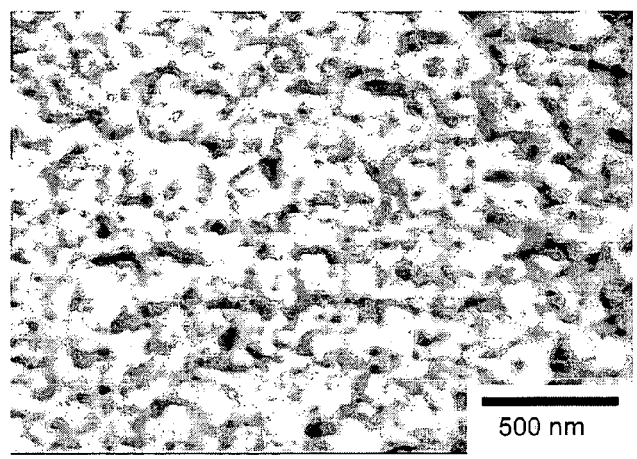
FIG. 13(a) is an SEM micrograph of the film of Example 1.
Figure 13B:
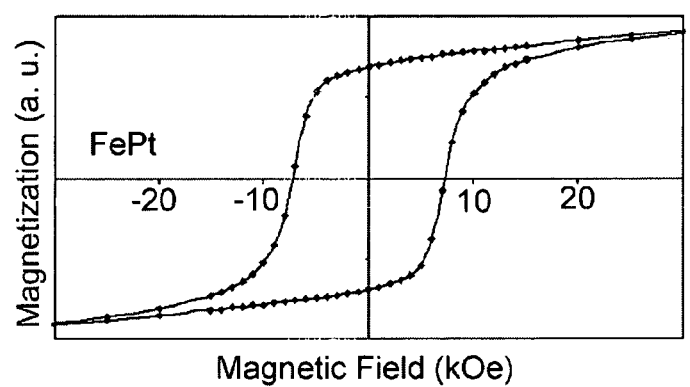
FIG. 13(b) is a graph showing SQUID analysis of the film of Example 1.
Figure 13C:
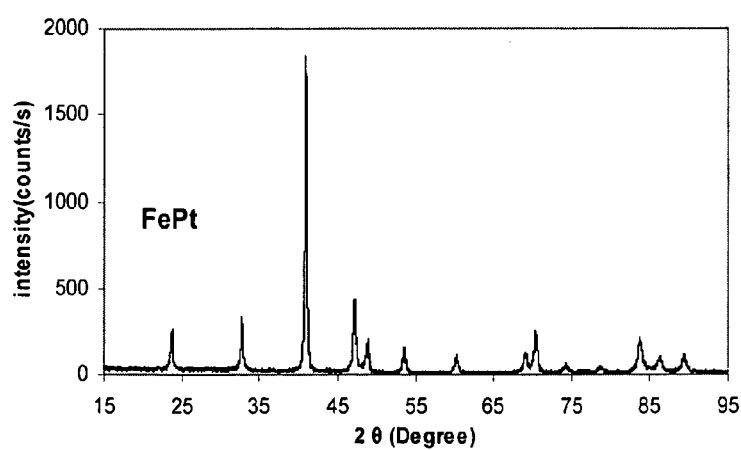
FIG. 13(c) is a graph showing XRD spectra for the film of Example 1.

Scanning Electron Microscopy (SEM), Powder X-ray Diffraction (XRD), Energy-dispersive X-ray (EDX) and SQUID were conducted to characterize final FePt in film and bulk forms. FIG. 13(a) is an SEM micrograph of the resulting film. In the micrograph, a granular films is observed. FIG. 13 (b) shows SQUID analysis of the resulting film. SQUID analysis shows that the ferromagnetic character of the fct FePt film has coercivity of 8 KOe measured at 5 Kelvin. FIG. 13(c) shows XRD analysis of the resulting film. XRD analysis shows that the granular films are the fct phase of FePt. The composition was confirmed to have an atomic ratio of $Fe_{56}Pt_{44}$ by EDX.

EXAMPLE 2

Synthesis of Face-Centered Tetragonal (fct) FePt in Film and Bulk Forms from Pt@$Fe_2O_3$ Core-Shell Particles (10 nm Pt Core and ~3.5 nm $Fe_2O_3$ Shell) at 650° C.

Pt@$Fe_2O_3$ core-shell particles were obtained by the procedure described in Example 1.

0.5 mL concentrated Pt@$Fe_2O_3$ particles in a 10 mg/mL hexane solution were slowly drop-cast onto a Si wafer under a fume hood. Hexane was allowed to evaporate. The wafer was then transferred into a tube furnace to anneal under a flow of $H_2$ (5 v/v %) in Ar gas at 550° C. for 2 hours. The annealing was conducted by preheating at room temperature for 10 minutes, heating to 350° C. at a rate of 150° C./h and maintaining temperature for 2 hours, heating to 650° C. at a rate of 100° C./h and maintaining at 650° C. for 2 hours, and cooling naturally to room temperature.

Figure 14A:
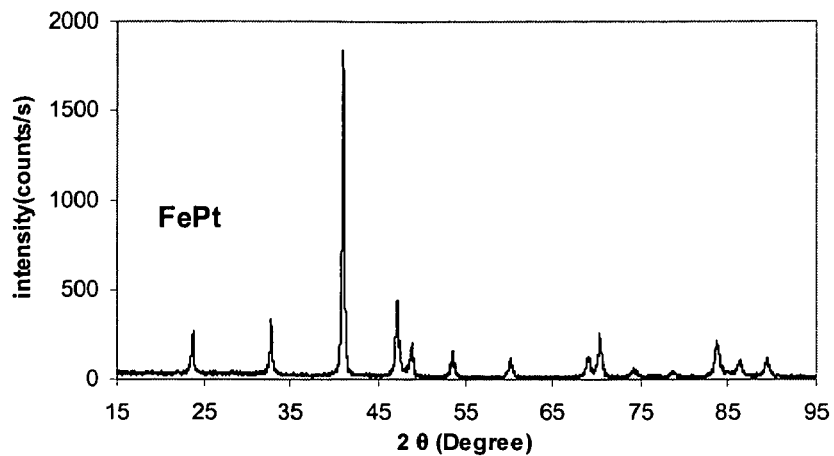
FIG. 14(a) is a graph showing XRD spectra for the film of Example 2.
Figure 14B:
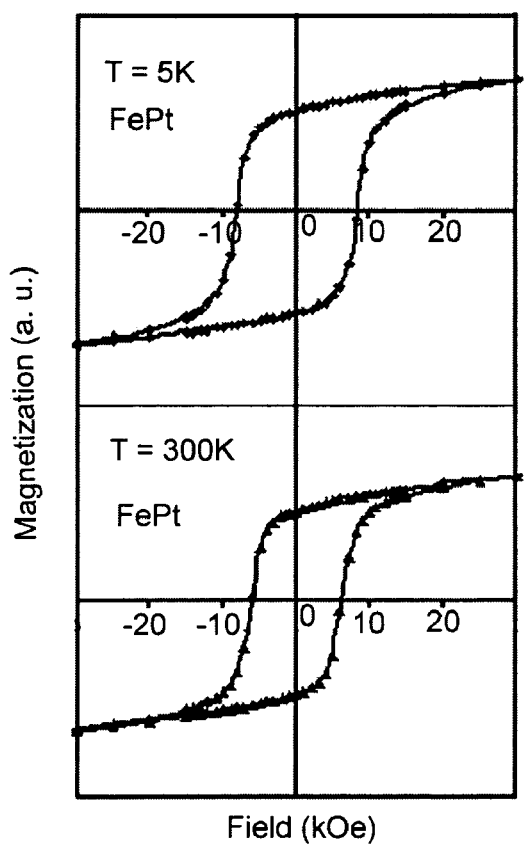
FIG. 14(b) is a graph showing SQUID analysis of the film of Example 2.

Powder X-ray Diffraction (XRD), Energy-dispersive X-ray (EDX) and SQUID were performed to characterize the fct FePt in film and bulk forms. FIG. 14(a) shows XRD analysis of the resulting film. XRD analysis shows that the material is fct phase of FePt. FIG. 14(b) shows SQUID analysis of the resulting film. SQUID showed that the ferromagnetic character of the fct FePt has a coercivity of 9.1 KOe measured at 5 Kelvin and 7.0 KOe at 300 Kelvin. The chemical composition was confirmed to have an atomic ratio of $Fe_{56}Pt_{44}$ by EDX.

EXAMPLE 3

Synthesis of Face-Centered Cubic (fcc) $Fe_3Pt$ in Film and Bulk Forms from Pt@$Fe_2O_3$ Core-Shell Particles (10 nm Pt Core and ~4 nm $Fe_2O_3$ Shell) at 550° C.

Pt@$Fe_2O_3$ core-shell nanoparticles as precursors were obtained by the procedure described in Example 1, except that 75 µL of Fe(CO)$_5$ were used. Pt@$Fe_2O_3$ core-shell particles were converted into fcc $Fe_3Pt$ in film and bulk forms by the procedure described in Example 1.

Figure 15A:
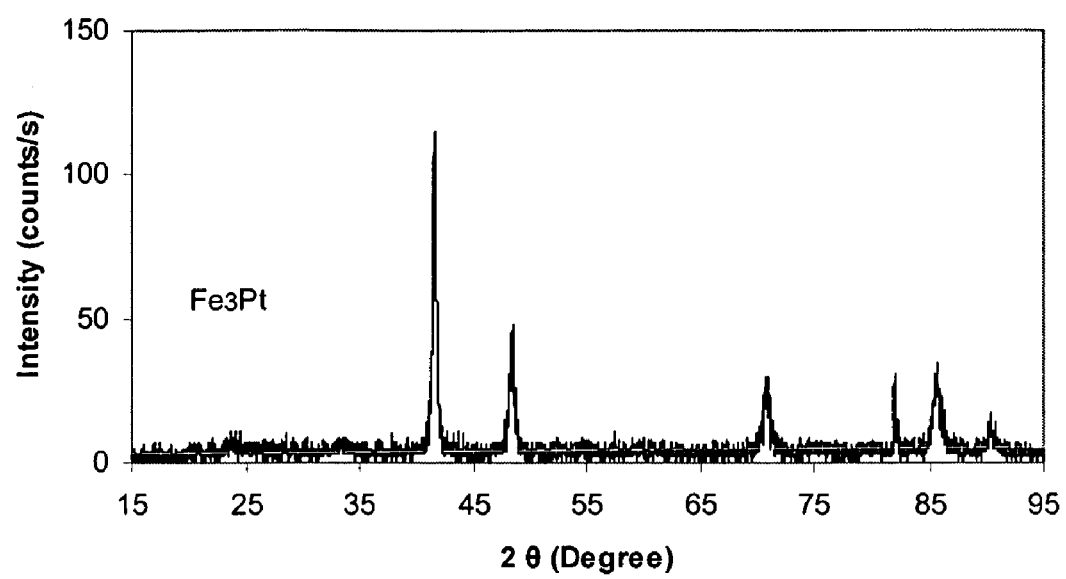
FIG. 15(a) is a graph showing XRD spectra for the film of Example 3.
Figure 15B:
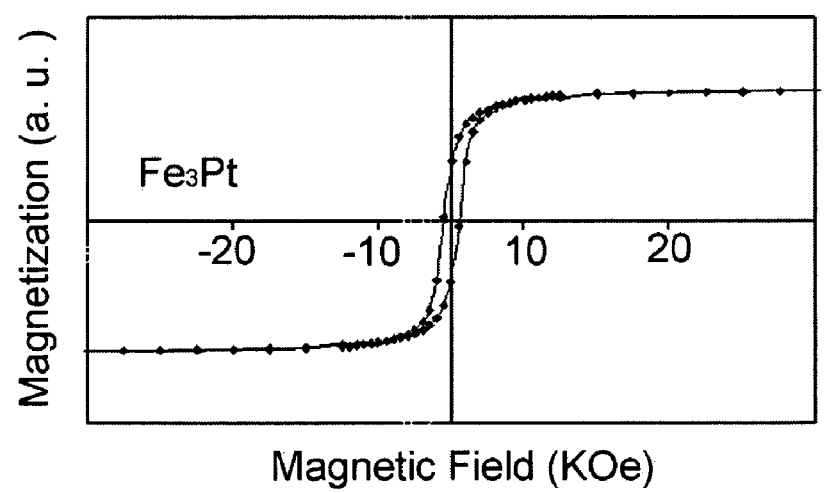
FIG. 15(b) is a graph showing SQUID analysis of the film of Example 3.

Powder X-ray Diffraction (XRD), Energy-Dispersive X-ray (EDX) and SQUID were used to characterize the samples in film and bulk forms. FIG. 15(a) shows XRD analysis of the resulting film. The XRD analysis shows that the granular film is the fcc phase of $Fe_3Pt$. FIG. 15(b) shows SQUID analysis of the resulting film. SQUID analysis shows that the ferromagnetic character of the fcc $Fe_3Pt$ film and bulk forms has a coercivity of 1 KOe measured at 5 Kelvin. The composition was confirmed to have an atomic ratio of $Fe_{72}Pt_{28}$ by EDX analysis.

EXAMPLE 4

Synthesis of Face-Centered Cubic (fcc) $FePt_3$ in Film and Bulk Forms from Pt@$Fe_2O_3$ Core-Shell Particles (10 nm Pt Core and ~2 nm $Fe_2O_3$ Shell) at 550° C.

Pt@$Fe_2O_3$ core-shell nanoparticles as precursors were obtained by the procedure described in Example 1, except that 30 µL of Fe(CO)$_5$ were used. Pt@$Fe_2O_3$ core-shell particles were converted into fcc $FePt_3$ in film and bulk forms by the procedure described in Example 1.

Figure 16A:
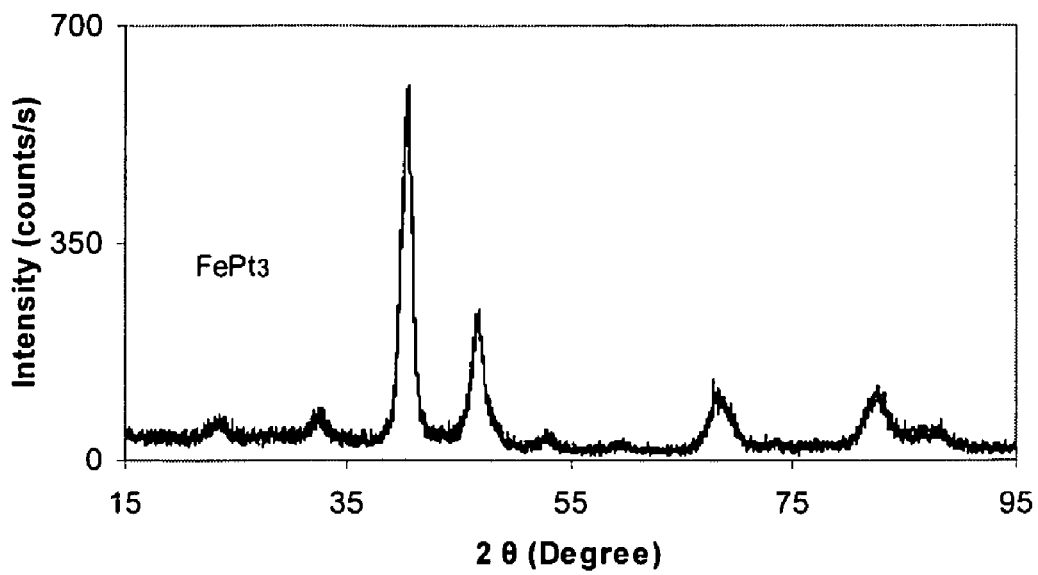
FIG. 16(a) is a graph showing XRD spectra for the film of Example 4.
Figure 16B:
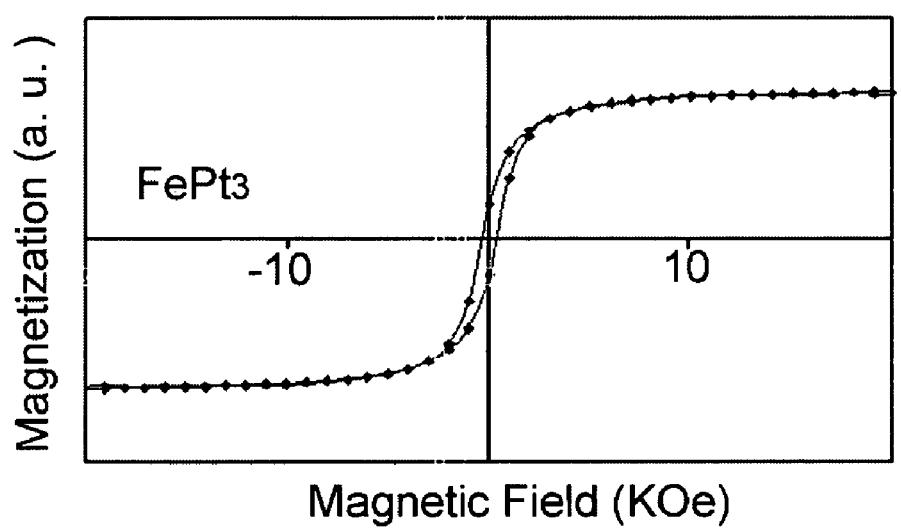
FIG. 16(b) is a graph showing SQUID analysis of the film of Example 4.

Powder X-ray Diffraction (XRD), Energy-Dispersive X-ray (EDX) and SQUID were used to characterize the samples in film and bulk forms. FIG. 16(a) shows XRD analysis of the resulting film. The XRD analysis shows that the granular film is the fcc phase of $Fe_3Pt$. FIG. 16(b) shows SQUID analysis of the resulting film. SQUID analysis shows that the ferromagnetic character of the fcc $Fe_3Pt$ film and bulk forms has a coercivity of 400 Oe measured at 5 Kelvin. The composition was confirmed to have an atomic ratio of $Fe_{30}Pt_{70}$ by EDX analysis.

EXAMPLE 5

Synthesis of Face-Centered Tetragonal (fct) FePt Particles from Pt@$Fe_2O_3$ Core-Shell Particles (10 nm Pt Core and ~3.5 nm $Fe_2O_3$ Shell) at 550° C.

Pt@$Fe_2O_3$ core-shell particles were obtained by the procedure described in Example 1.

Pt@$Fe_2O_3$ core-shell particles were deposited as a monolayer on a substrate using a Langmuir trough (model: KSV 3000) at a surface pressure of 45 mN m$^{-1}$. The substrate was placed on a piece of $SiO_2$ slide and transferred into a tube furnace to anneal under a flow of $H_2$ (5 v/v %) in Ar gas at 550° C. for 2 hours. Annealing was conducted by preheating at room temperature for 10 minutes, heating to 350° C. at a rate of 150° C./h and maintaining temperature for 2 hours, heating to 550° C. at a rate of 100° C./h and maintaining temperature for 2 hours, and cooling naturally to room temperature.

Figure 17:
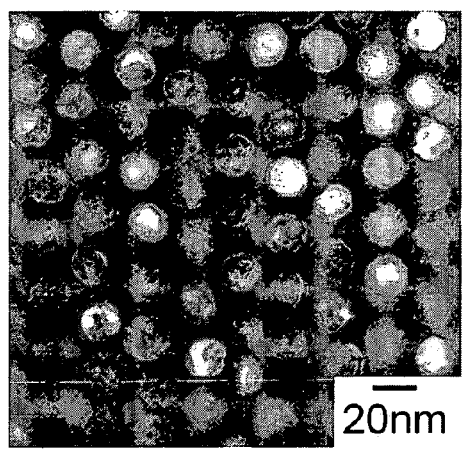
FIG. 17 is a TEM micrograph of the particles of Example 5.

Transmission Electron Microscopy (TEM), Scanning Electron Microscopy (SEM), Energy-Dispersive X-ray (EDX) and SQUID were used to characterize the fct FePt particles. The monolayer of FePt particles was observed using TEM and SEM. FIG. 17 is a TEM micrograph. The composition was confirmed to have an average atomic ratio of $Fe_{50}Pt_{50}$ by EDX analysis.

EXAMPLE 6

Synthesis of Face-Centered Cubic (fcc) $Fe_3Pt$ Particles from $Pt@Fe_2O_3$ Core-Shell Particles (10 nm Pt Core and ~4 nm $Fe_2O_3$ Shell) at 550° C.

$Pt@Fe_2O_3$ core-shell nanoparticles as precursors were obtained by the procedure described in Example 1, except that 75 μL of $Fe(CO)_5$ were used. $Pt@Fe_2O_3$ core-shell particles were converted into fcc $Fe_3Pt$ particles (~18 nm) by the procedure described in Example 5.

Figure 18:
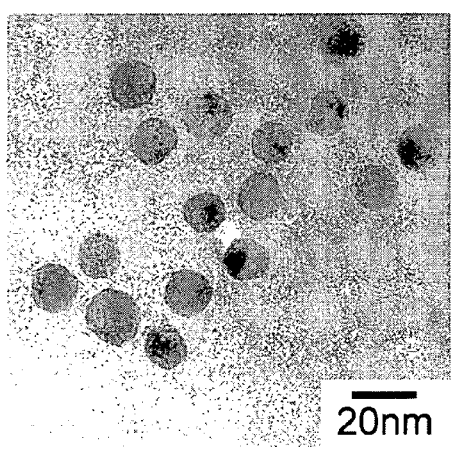
FIG. 18 is a TEM micrograph of the particles of Example 6.

Transmission Electron Microscopy (TEM) was used to characterize the fcc $Fe_3Pt$ particles. FIG. 18 is a TEM micrograph.

EXAMPLE 7

Synthesis of Face-Centered Cubic (fcc) $FePt_3$ Particles from $Pt@Fe_2O_3$ Core-Shell Particles (10 nm Pt Core and ~2 nm $Fe_2O_3$ shell) at 550° C.

$Pt@Fe_2O_3$ core-shell nanoparticles as precursors were obtained by the procedure described in Example 1, except that 35 μL of $Fe(CO)_5$ were used. $Pt@Fe_2O_3$ core-shell particles were converted into fcc $FePt_3$ particles by the procedure described in Example 5.

Figure 19:
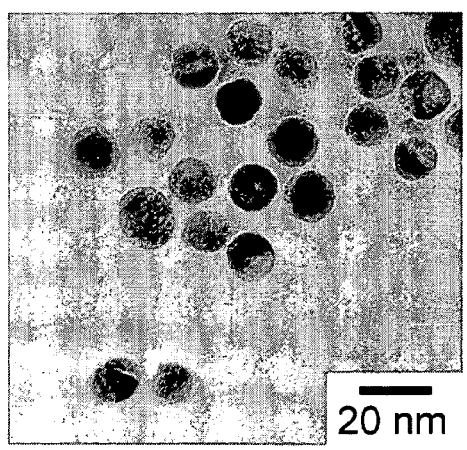
FIG. 19 is a TEM micrograph of the particles of Example 7.

Transmission Electron Microscopy (TEM) was used to show a monolayer of $FePt_3$ particles. FIG. 19 is a TEM micrograph.

EXAMPLE 8

Synthesis of Face-Centered Tetragonal (fct) FePt in Film and Bulk Forms from 4 nm $Pt@Fe_2O_3$ Core-Shell Particles at 450° C.

A mixture of 100 mg of 1,2-hexadecanediol, 55 mg of platinum acetylacetonate, 5 mL octyl ether, 120 μL of oleic acid and 45 μL of oleylamine were added to a 15 mL three-neck round-bottle flask under argon protection. The mixture was agitated vigorously using a magnetic stirrer and dissolved completely to become a transparent orange solution at 60° C. The solution was heated to 190–200° C. at a rate of 5° C./min, and began to turn black at this temperature indicating the formation of Pt nanoparticles. After reaction at this temperature for 1 min, 50 μL $Fe(CO)_5$ were slowly injected into the solution. The solution was heated to reflux temperature (~290° C.), the temperature was maintained for 30 minutes and the solution was cooled to room temperature. After the reaction, size selection separation using hexane and ethanol was conducted followed by conversion in Ar and $H_2$ forming gas. 200 μL of the product mixture was transferred into a 2 mL vial and 1.8 mL of ethanol were added to induce precipitation of nanoparticles. The nanoparticles were separated from the solvent by centrifuging at 5000 rpm for 5 minutes. Yellow-brown supernatant was discarded and the black precipitated nanoparticles were recovered by suspending the nanoparticles in 0.5 mL of hexane in the presence of 10 μL of oleic acid. 1.5 mL ethanol was added and the mixture was centrifuged to precipitate the particles. The particles were dispersed in 1.5 mL of hexane. After centrifuging, the transparent supernatant was collected and the precipitate was discarded. The final product was stored in hexane.

0.5 mL concentrated $Pt@Fe_2O_3$ particles in hexane solution (10 mg/mL) were slowly drop-cast onto a Si wafer under a fume hood. Hexane was allowed to evaporate. The wafer was then transferred to a tube furnace to anneal under a flow of $H_2$ (5 v/v %) in Ar gas at 450° C. for 30 minutes. Annealing was conducted by preheating at room temperature for 10 minutes, heating to 300° C. at a rate of 150° C./h and maintaining temperature for 2 hours, heating to 450° C. at a rate of 100° C./h and maintaining temperature for 30 minutes, and cooling naturally to room temperature.

Figure 20A:
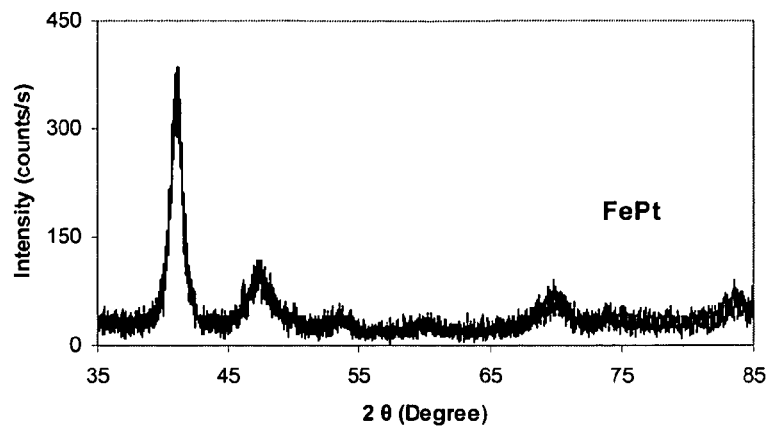
FIG. 20(a) is a graph showing XRD spectra for the film of Example 8.
Figure 20B:
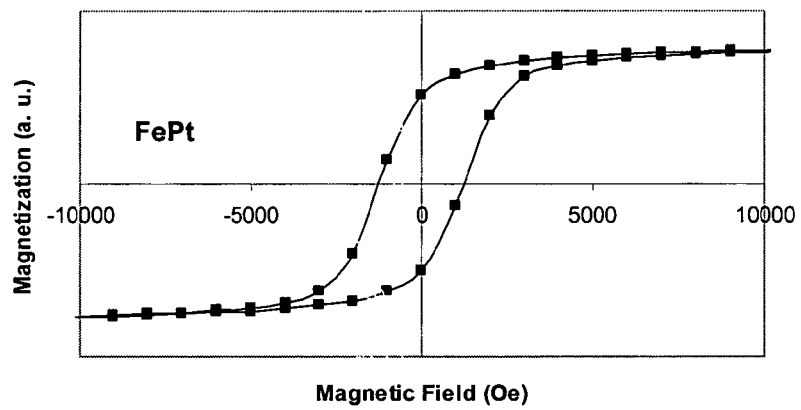
FIG. 20(b) is a graph showing SQUID analysis of the film of Example 8.

Powder X-ray Diffraction (XRD), Energy-Dispersive X-ray (EDX) and SQUID were used to characterize the samples in film and bulk forms. FIG. 20(a) shows XRD analysis of the resulting film. The XRD analysis shows that the granular film is the fct phase of FePt. FIG. 20(b) shows SQUID analysis of the resulting film. SQUID analysis shows that the ferromagnetic character of the fct FePt film and bulk forms has a coercivity of 1.7 KOe measured at 5 Kelvin and 500 Oe at 300 Kelvin.

EXAMPLE 9

Synthesis of Face-Centered Cubic (fcc) $Fe_3Pt$ in Film and Bulk Forms from 4 nm $Pt@Fe_2O_3$ Core-Shell Particles at 450° C.

4 nm $Pt@Fe_2O_3$ core-shell nanoparticles as precursors were obtained by the procedure described in Example 8, except that 70 μL $Fe(CO)_5$ were used. $Pt@Fe_2O_3$ core-shell particles were converted into fcc $Fe_3Pt$ in film and bulk forms by the procedure described in Example 8.

Figure 21:
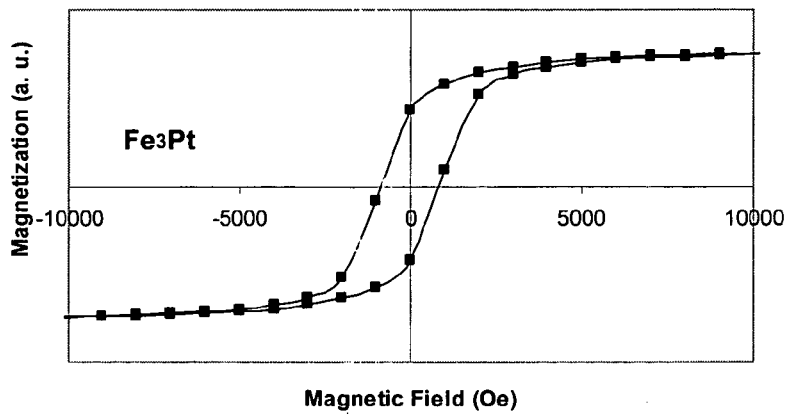
FIG. 21 is a graph showing SQUID analysis of the film of Example 9.

Powder X-ray Diffraction (XRD), Energy-Dispersive X-ray (EDX) and SQUID were used to characterize the samples in film and bulk forms. The XRD analysis shows that the granular film is the fcc phase of $Fe_3Pt$. FIG. 21 shows SQUID analysis of the resulting film. SQUID analysis shows that the ferromagnetic character of the fcc of $Fe_3Pt$ film and bulk forms has a coercivity of 800 Oe measured at 5 Kelvin.

EXAMPLE 10

Synthesis of Face-Centered Cubic (fcc) $FePt_3$ in Film and Bulk Forms from $Pt@Fe_2O_3$ Core-Shell Particles (4 nm) at 450° C.

$Pt@Fe_2O_3$ core-shell nanoparticles (~4 nm) as precursors were obtained by the procedure described in Example 8, except that 20 μL $Fe(CO)_5$ were used. $Pt@Fe_2O_3$ core-shell particles were converted into fcc $FePt_3$ in film and bulk forms by the procedure described in Example 8.

Powder X-ray Diffraction (XRD) and Energy-Dispersive X-ray (EDX) were used to characterize the $FePt_3$ in film and bulk forms. The XRD analysis showed the granular film was the fcc phase of $FePt_3$. The composition was confirmed to have an atomic ratio of $Fe_{23}Pt_{77}$ by EDX analysis.

EXAMPLE 11

Synthesis of Face-Centered Tetragonal (fct) FePt Particles from Pt@Fe$_2$O$_3$ Core-Shell Particles (4 nm) at 450° C.

Pt@Fe$_2$O$_3$ core-shell nanoparticles as precursors were obtained by the procedure described in Example 1.

Pt@Fe$_2$O$_3$ core-shell particles were deposited as a monolayer on a substrate using a Langmuir trough (model: KSV 3000) at a surface pressure of 45 mN m$^{-1}$. The substrate was covered with a piece of SiO$_2$ slide and transferred into a tube furnace to anneal under a flow of H$_2$ (5 v/v %) in Ar gas at 450° C. for 30 minutes. Annealing was conducted by preheating at room temperature for 10 minutes, heating to 300° C. at a rate of 150° C./h and maintaining temperature for 2 hours, heating to 450° C. at a rate of 100° C./h and maintaining temperature for 30 minutes, and cooling naturally to room temperature.

To characterize the fct FePt particles, Transmission Electron Microscopy (TEM) was performed. A monolayer of FePt particles was observed by TEM.

EXAMPLE 12

Synthesis of Face-Centered Tetragonal (fct) FePt—Fe Nanocomposite in Film and Bulk Forms from 4 nm Pt@Fe$_2$O$_3$ Core-Shell Particles at 450° C.

Pt@Fe$_2$O$_3$ core-shell nanoparticles (~4 nm) as precursors were obtained by the procedure described in Example 8, except that 60 µL of Fe(CO)$_5$ were used. Pt@Fe$_2$O$_3$ core-shell particles were converted into fct FePt—Fe nanocomposite in film and bulk forms by the procedure described in Example 8.

Figure 22A:
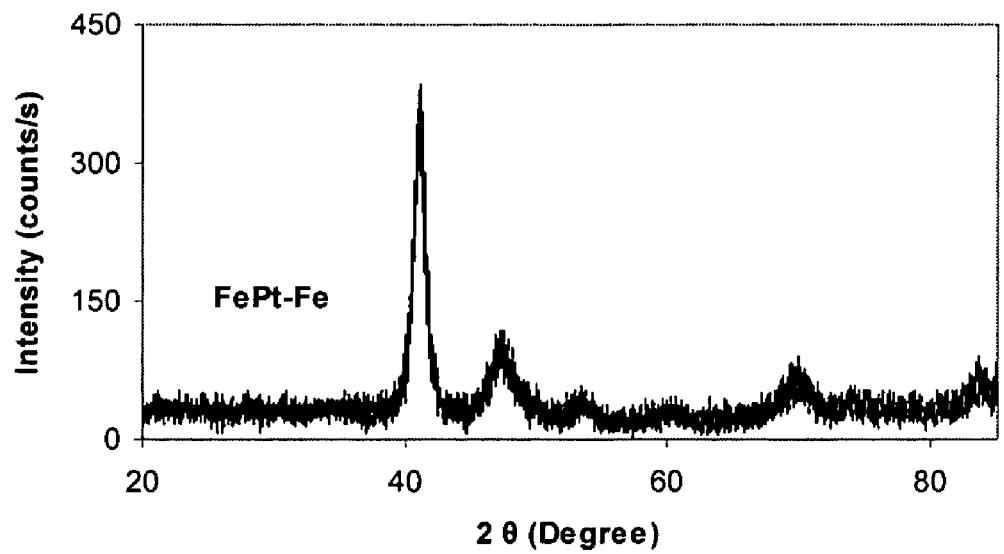
FIG. 22(a) is a graph showing XRD spectra for the film of Example 12.
Figure 22B:
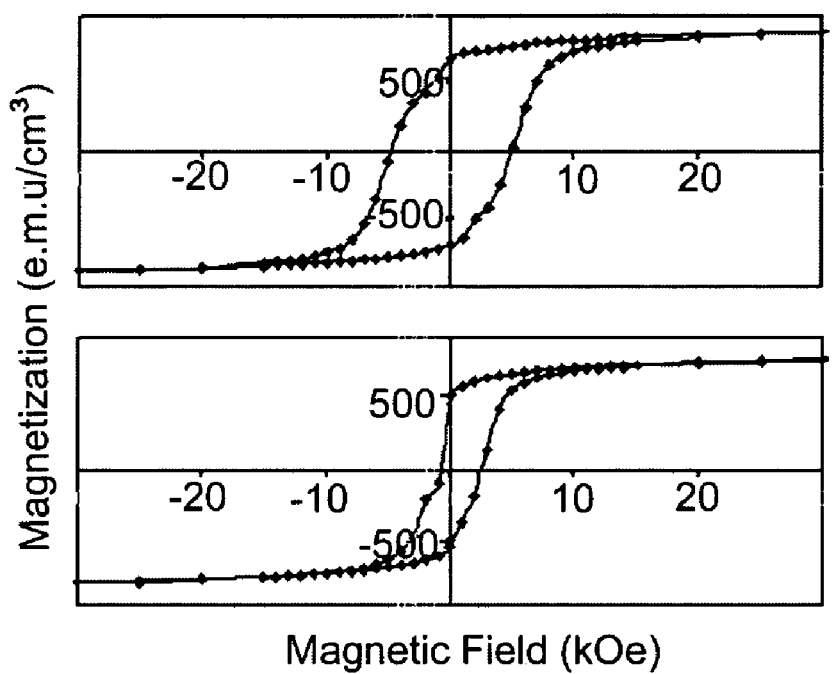
FIG. 22(b) is a graph showing SQUID analysis of the film of Example 12.

Powder X-ray Diffraction (XRD), Energy-Dispersive X-ray (EDX) and SQUID were used to characterize the FePt—Fe nanocomposites. FIG. 22(*a*) shows XRD analysis of the resulting film. The XRD analysis shows that all diffraction peaks come from fct FePt. FIG. 22(*b*) shows SQUID analysis of the resulting film. SQUID analysis shows that the ferromagnetic character of the FePt—Fe nanocomposites has a coercivity of 5.1 KOe measured at 5 Kelvin (upper portion of FIG. 22(*b*)). An exchange bias field of 850 Oe was obtained for the nanocomposites at 300 Kelvin (lower portion of FIG. 22(*b*)). The composition was confirmed to have an atomic ratio of Fe$_{60}$Pt$_{40}$ using EDX analysis.

EXAMPLE 13

Synthesis of Face-Centered Tetragonal (fct) FePt@Fe Core-Shell Nanoparticles from 4 nm Pt@Fe$_2$O$_3$ Core-Shell Particles at 450° C.)

4 nm Pt@Fe$_2$O$_3$ core-shell nanoparticles as precursors were obtained by the procedure described in Example 8, except that 60 µL of Fe(CO)$_5$ were used. 4 nm Pt@Fe$_2$O$_3$ core-shell particles were converted into fct FePt@Fe core-shell nanoparticles by the procedure described in Example 8.

Figure 23:
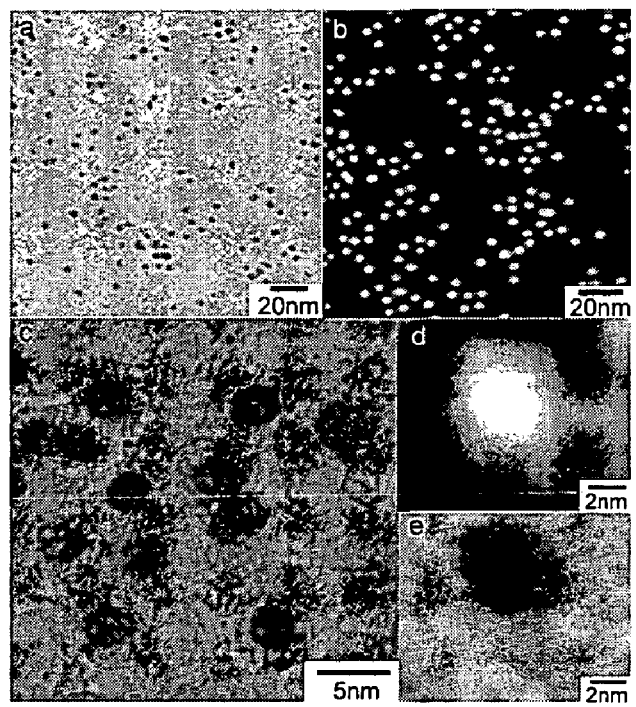
FIG. 23 is a TEM micrograph of the particles of Example 13.

Transmission Electron Microscopy (TEM) and Energy-Dispersive X-ray (EDX) were used to characterize the FePt@Fe particles. FIG. 23 is a TEM micrograph. The monolayer of FePt@Fe particles are shown to have a distinguished core and shell. The high-resolution TEM images also show the lattice of fct FePt. The composition was confirmed to have an average atomic ratio of Fe$_{59}$Pt$_{41}$ by EDX analysis.

EXAMPLE 14

Synthesis of Fe$_3$Pt@Fe Particles from 19 nm Pt@Fe$_2$O$_3$ Core-Shell Particles (10 nm Pt core and 4.5 nm Fe$_2$O$_3$ Shell) at 550° C.

19 nm Pt@Fe$_2$O$_3$ core-shell particles were obtained by the procedure described in Example 1, except 160 µL Fe(CO)$_5$ were used. Pt@Fe$_2$O$_3$ core-shell particles were converted into Fe$_3$Pt@Fe particles by the procedure described in Example 5.

Figure 24:
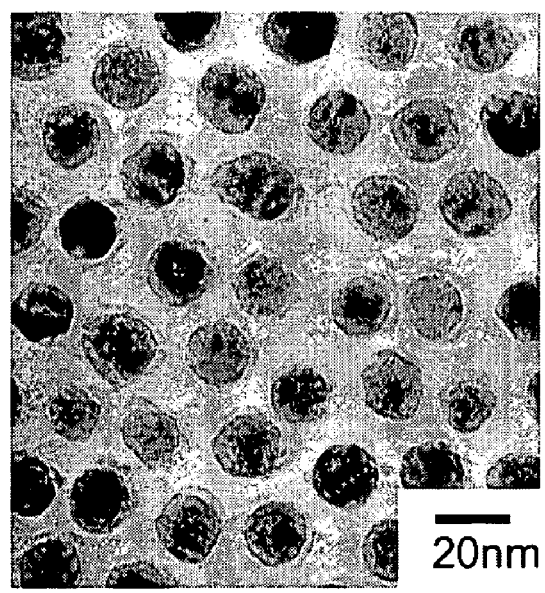
FIG. 24 is a TEM micrograph of the particles of Example 14.

Transmission Electron Microscopy (TEM) was used to characterize the Fe$_3$Pt@Fe particles. FIG. 24 is a TEM micrograph. The micrograph shows the monolayer of Fe$_3$Pt@Fe particles.

EXAMPLE 15

Synthesis of Fe$_3$Pt—Fe in Film and Bulk Forms from Pt@Fe$_2$O$_3$ Core-Shell Particles (10 nm Pt Core and 4.5 nm Fe$_2$O$_3$ Shell) at 550° C.

19 nm Pt@Fe$_2$O$_3$ core-shell particles were obtained by the procedure described in Example 1, except 160 µL Fe(CO)$_5$ were used. Pt@Fe$_2$O$_3$ core-shell particles were converted into Fe$_3$Pt—Fe nanocomposite in film and bulk forms by the procedure described in Example 1.

Figure 25:
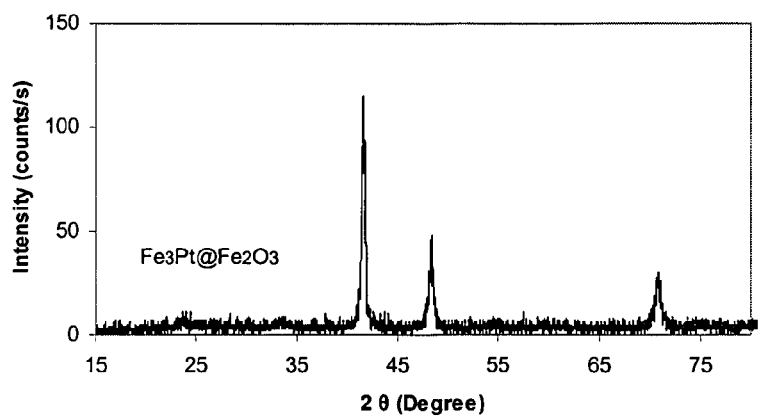
FIG. 25 is a graph showing XRD spectra for the film of Example 15.

Powder X-ray diffraction (XRD) and energy dispersive X-ray (EDX) were used to characterize the samples in film and bulk forms. FIG. 25 shows XRD analysis of the resulting film. The XRD analysis shows that all peaks come from the fcc phase of Fe$_3$Pt. The composition was confirmed to have an atomic ratio of Fe$_{80}$Pt$_{20}$ by EDX analysis.

EXAMPLE 16

Synthesis of Pt$_3$Co@Fe$_2$O$_3$ Core-Shell Particles with 1 Nanometer Shell Thickness 50 mg of cobalt carbonyl (Co$_2$(CO)$_8$) was added to 0.5 mL of diphenyl ether. The cobalt carbonyl completely dissolved at 60° C. A mixture of 140 mg of 1,2-hexadecanediol, 40 mg of platinum acetylacetonate, 2 mL of diphenyl ether, 4 g of hexadecylamine and 90 mg of 1,2 adamantanecarboxylic acid were added to a 15 mL three-neck round-bottle flask under argon protection. The mixture was heated to 160° C. at a rate of 5° C./min. The solution of Co$_2$(CO)$_8$ in diphenyl ether was quickly injected into the flask, which resulted in rapid formation of a black suspension, indicating the generation of nanoparticles. The solution was heated to reflux temperature (~260–270° C.) and that temperature was maintained for 40 minutes. After the reaction, the solution was cooled to 170–180° C., at which temperature 30 µL of Fe(CO)$_5$ was injected slowly into the reaction mixture. After reflux for an additional 30 minutes, the solution was cooled to room temperature. Size selection separation was conducted using chloroform and ethanol. 200 µL of the product mixture was diluted with 300 µL of chloroform and transferred to a 2 mL vial. 1.8 mL of ethanol were added to induce precipitation of nanoparticles. The nanoparticles were separated from solvent by centrifuging at 5000 rpm for 5 minutes. Yellow-brown supernatant was discarded and the black precipitated nanoparticles were recovered by suspension in 0.5 mL of chloroform. 1.5 mL of ethanol were added to the suspension and the suspension was centrifuged to precipitate the particles. The product was dispersed in 1.5 mL of chloroform and centrifuged. The transparent supernatant was collected and the precipitate was discarded. The final product was stored in chloroform.

Figure 26A:
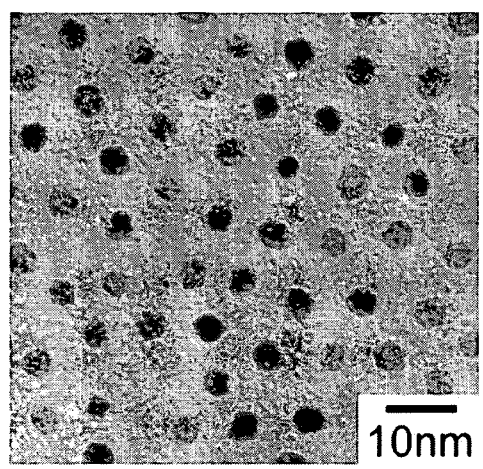
FIG. 26(a) is a TEM micrograph of the particles of Example 16.
Figure 26B:
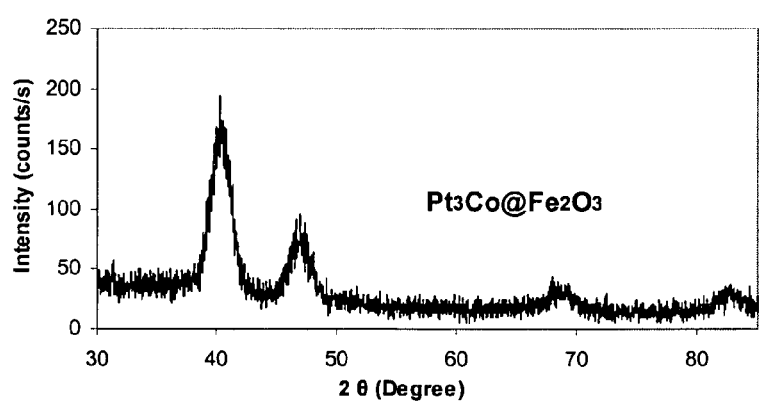
FIG. 26(b) is a graph showing XRD spectra for the particles of Example 16.

Transmission electron microscopy (TEM) and XRD were used to characterize the $CoPt_3@Fe_2O_3$ particles. FIG. 26(*a*) is a TEM micrograph. The micrograph shows monodispersed $CoPt_3@Fe_2O_3$ particles. The core size was around 4 nm although the thin shell layer of $Fe_2O_3$ was hard to distinguish from the core. FIG. 26(*b*) shows XRD analysis of the resulting film. The XRD analysis shows peaks that can be indexed to fcc $CoPt_3$ alloy.

EXAMPLE 17

Synthesis of $Pt_3Co@Fe_2O_3$ Core-Shell Particles with 2–3 nm Shell Thickness $Pt_3Co@Fe_2O_3$ nanoparticles with an average overall diameter of 9 nm were obtained by the procedure described in Example 16, except that 50 µL of $Fe(CO)_5$ were used.

Figure 27A:
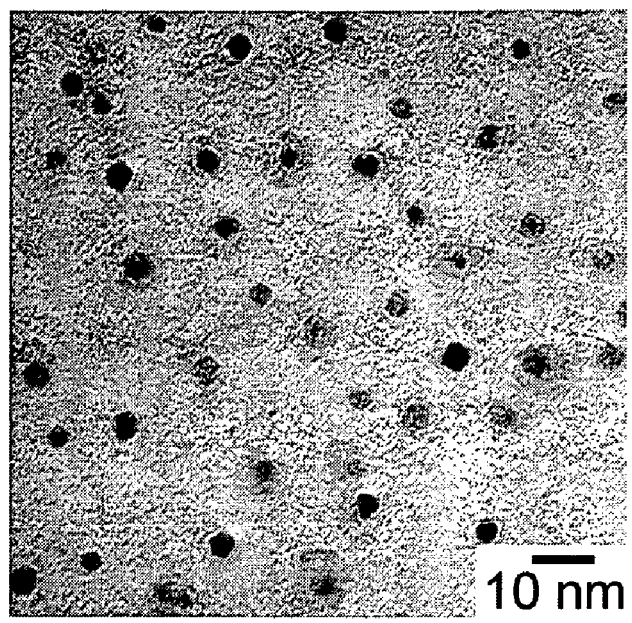
FIG. 27(a) is a TEM micrograph of the particles of Example 17.
Figure 27B:
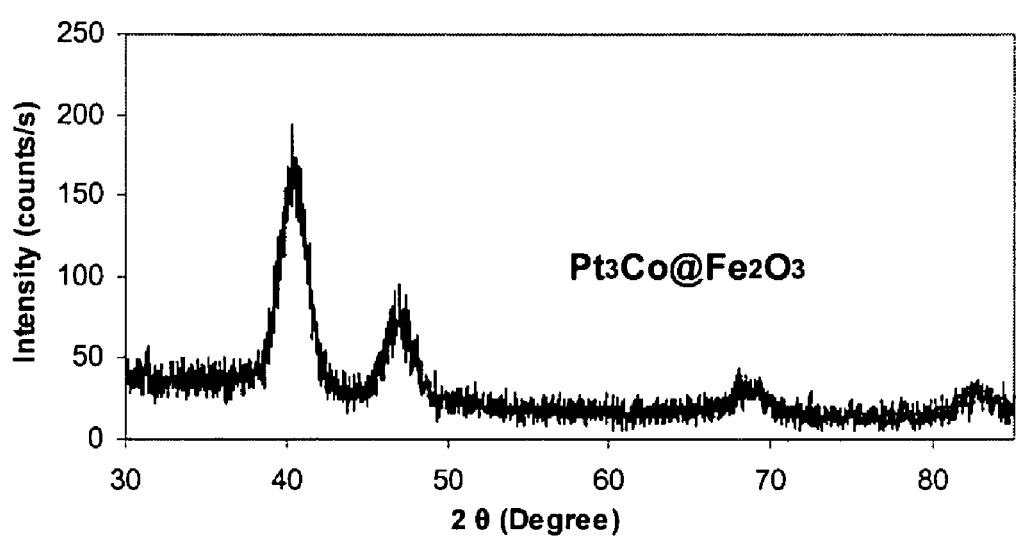
FIG. 27(b) is a graph showing XRD spectra for the particles of Example 17.

Transmission electron microscopy (TEM) and XRD were used to characterize the $CoPt_3@Fe_2O_3$ particles. FIG. 27(*a*) is a TEM micrograph. The micrograph shows monodisperse $CoPt_3@Fe_2O_3$ particles. FIG. 27(*b*) shows XRD analysis of the resulting film. The XRD analysis shows peaks that can be indexed to fcc $CoPt_3$ alloy.

EXAMPLE 18

Synthesis of PtCoFe in Film and Bulk Forms from $Pt_3Co@Fe_2O_3$ Core-Shell Particles (4 nm $Pt_3Co$ Core and ~1 nm $Fe_2O_3$ Shell) at 700° C.

$Pt_3Co@Fe_2O_3$ nanoparticles with an average overall diameter of 5 nm were obtained by the procedure described in Example 16.

0.5 mL concentrated $Pt_3Co@Fe_2O_3$ particles in a 10 mg/mL hexane solution were slowly drop-cast onto a Si wafer under a fume hood. Hexane was allowed to evaporate. The samples were then transferred to a tube furnace to anneal under a flow of $H_2$ (5 v/v %) in Ar gas at 700° C. for 1 hour. Annealing was conducted by preheating at room temperature for 10 minutes, heating to 350° C. at a rate of 150° C./h and maintaining temperature for 2 hours, heating to 700° C. at a rate of 100° C./h and maintaining temperature for 1 hour, and cooling naturally to room temperature.

Figure 28A:
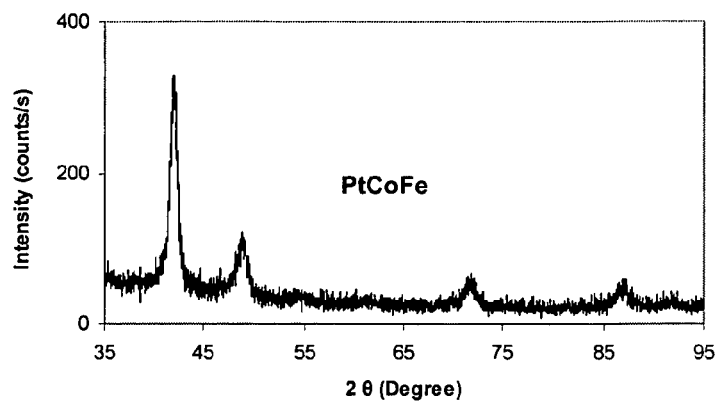
FIG. 28(a) is a graph showing XRD spectra for the film of Example 18.
Figure 28B:
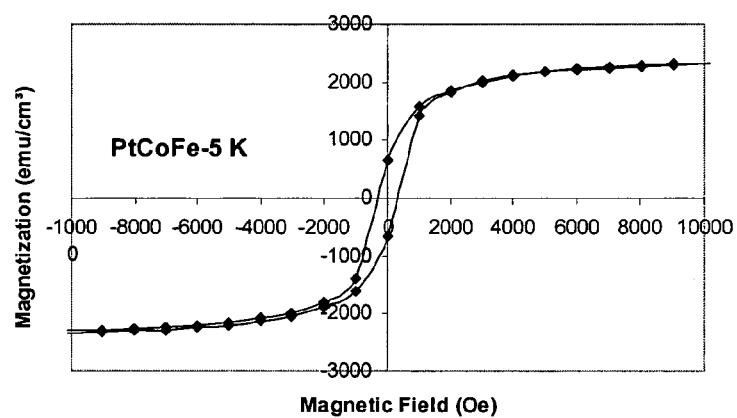
FIGS. 28(b) and 28(c) are graphs showing SQUID analyses of the film of Example 18.
Figure 28C:
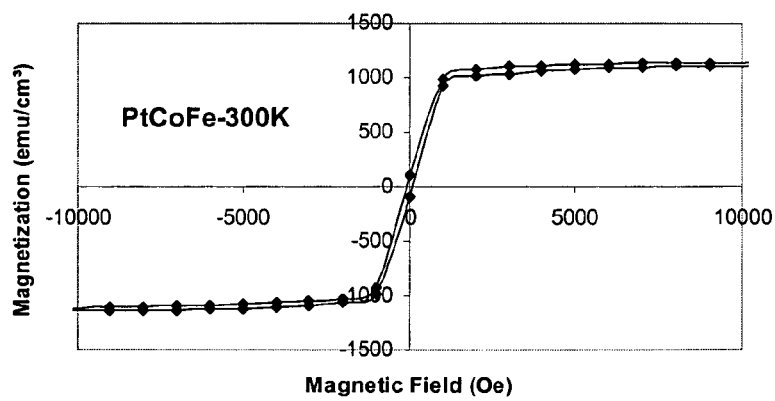

Powder X-ray Diffraction (XRD), energy dispersive X-ray (EDX) and SQUID were used to characterize the PtCoFe in film and bulk forms. The composition was confirmed to have an atomic ratio of $Pt_{65}CO_{20}Fe_{15}$ by EDX analysis. FIG. 28(*a*) shows XRD analysis of the resulting film. FIGS. 28(*b*) and 28(*c*) show SQUID analysis of the resulting film.

EXAMPLE 19

Synthesis of PtCoFe in Film and Bulk Forms from $Pt_3Co@Fe_2O_3$ Core-Shell Particles (4 nm $Pt_3Co$ Core and 2~3 nm $Fe_2O_3$ Shell) at 700° C.)

$Pt_3Co@Fe_2O_3$ nanoparticles with an average overall diameter of 9 nm were obtained by the procedure described in Example 16, except that 50 µL of $Fe(CO)_5$ were used.

$Pt_3Co@Fe_2O_3$ core-shell particles were converted into PtCoFe in film and bulk forms by the procedure described in Example 18.

Figure 29:
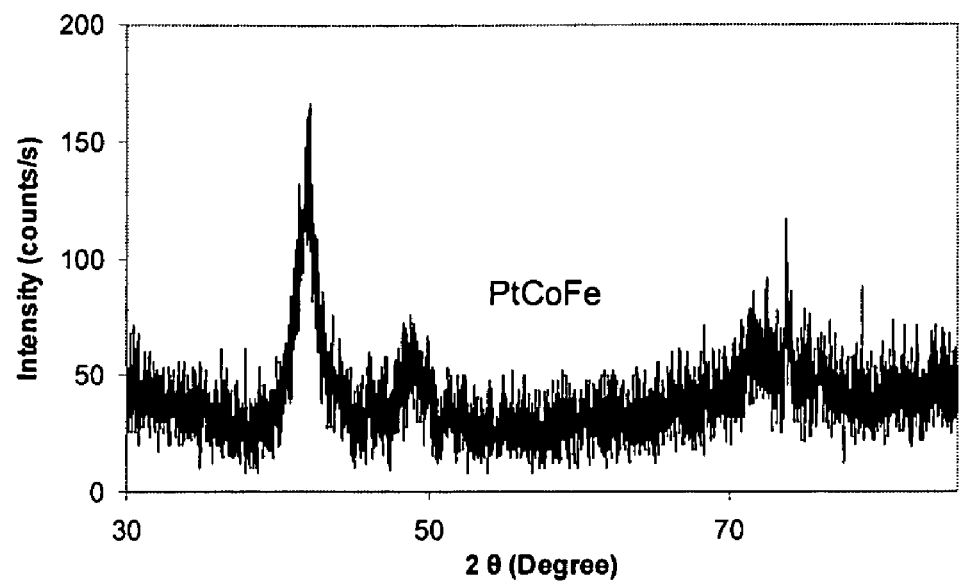
FIG. 29 is a graph showing XRD spectra for the film of Example 19.

Powder X-ray diffraction (XRD) and energy-dispersive X-ray (EDX) were used to characterize the PtCoFe in film and bulk forms. FIG. 29 shows XRD analysis of the resulting film. The composition was confirmed to have an atomic ratio of $Pt_{55}Co_{18}Fe_{27}$ by EDX analysis.

EXAMPLE 20

Synthesis of PtCoFe in Film and Bulk Forms from $Pt_3Co@Fe_2O_3$ Core-Shell (4 nm $Pt_3Co$ Core and ~1 nm $Fe_2O_3$ shell) at 600° C.

$Pt_3Co@Fe_2O_3$ nanoparticles with an average overall diameter of 4 nm were obtained by the procedure described in Example 16.

0.5 mL concentrated $Pt_3Co@Fe_2O_3$ particles in a 10 mg/mL hexane solution were slowly drop-cast onto a Si wafer under a fume hood. Hexane was allowed to evaporate. The samples were then transferred into a tube furnace to anneal under a flow of $H_2$ (5 v/v %) in Ar gas at 600° C. for 2 hours. Annealing was conducted by preheating at room temperature for 10 minutes, heating to 350° C. at a rate of 150° C./h and maintaining temperature for 2 hours, heating to 600° C. at a rate of 100° C./h and maintaining temperature for 2 hours, and cooling naturally to room temperature.

Powder X-ray Diffraction (XRD) and Energy-Dispersive X-ray (EDX) were used to characterize the PtCoFe in film and bulk form. XRD analysis showed that a new alloy was formed. The composition was confirmed to have an atomic ratio of $Pt_{65}Co_{20}Fe_{15}$ by EDX analysis.

EXAMPLE 21

Synthesis of PtCoFe in Film and Bulk Forms from $Pt_3Co@Fe_2O_3$ Core-Shell Particles with (4 nm $Pt_3Co$ Core and ~1 nm $Fe_2O_3$ Shell) at 500° C.

$Pt_3Co@Fe_2O_3$ nanoparticles with an average overall diameter of 4 nm were obtained by the procedure described in Example 16.

0.5 mL concentrated $Pt_3Co@Fe_2O_3$ particles in a 10 mg/mL hexane solution were slowly drop-cast onto a Si wafer under a fume hood. Hexane was allowed to evaporate. The samples were then transferred into a tube furnace to anneal under a flow of $H_2$ (5 v/v %) in Ar gas at 500° C. for 2 hours. Annealing was conducted by preheating at room temperature for 10 minutes, heating to 350° C. at a rate of 150° C./h and maintaining temperature for 2 hours, heating to 500° C. at a rate of 100° C./h and maintaining temperature for 2 hours, and cooling naturally to room temperature.

Powder X-ray diffraction (XRD) and energy-dispersive X-ray (EDX) were used to characterize the PtCoFe in film and bulk forms. XRD analysis showed that a new alloy was formed. The composition was confirmed to have an atomic ratio of $Pt_{65}Co_{20}Fe_{15}$ by EDX analysis.

EXAMPLE 22

Synthesis of PtCoFe Particles from $Pt_3Co@Fe_2O_3$ Core-Shell Particles (4 nm $Pt_3Co$ core and ~1 nm $Fe_2O_3$ Shell)

$Pt_3Co@Fe_2O_3$ nanoparticles with an average overall diameter of 4 nm were obtained by the procedure described in Example 16.

Pt@Fe$_2$O$_3$ core-shell particles were deposited as a monolayer on a substrate using a Langmuir trough (model: KSV 3000) at a surface pressure of 45 mN m$^{-1}$. The substrate was covered with a piece of quartz slide and transferred to a tube furnace to anneal under a flow of H$_2$ (5 v/v %) in Ar gas at 500° C. for 2 hours. Annealing was conducted by preheating at room temperature for 10 minutes, heating to 350° C. at a rate of 150° C./h and maintaining temperature for 2 hours, heating to 500° C. at a rate of 100° C./h and maintaining temperature for 2 h, and cooling naturally to room temperature.

Transmission Electron Microscopy (TEM) and energy dispersive X-ray (EDX) were performed to characterize the PtCoFe particles. TEM micrographs showed monodisperse PtCoFe particles. The composition was confirmed to have an an atomic ratio of Pt$_{68}$Co$_{20}$Fe$_{12}$ by EDX.

EXAMPLE 23

Synthesis of Co@Fe$_2$O$_3$ Core-Shell Particles 0.54 g Co$_2$(CO)$_8$ were dissolved in 3 mL of dichlorobenzene at 45° C. 12 mL of dichlorobenzene, 200 µL of oleic acid and 0.1 g of trioctylphosphine oxide (TOPO) were heated to reflux at 200° C. The solution of Co$_2$(CO)$_8$ in dichlorobenzene mixture was injected into the dichlorobenzene solution. The temperature of the mixture was maintained for 30 minutes then cooled down to 150° C., at which time 50 µL of Fe(CO)$_5$ were injected. The mixture was heated to 200° C., the temperature was maintained for 30 minutes and then cooled to room temperature. 200 µL of the product mixture was transferred into a 2 mL vial. 1.8 mL ethanol were added to induce the precipitation of nanoparticles. The nanoparticles were separated from solvent by centrifuging at 5000 rpm for 5 minutes. Yellow-brown supernatant was discarded and the black precipitate was recovered by suspension in 0.5 mL of hexane in the presence of 10 µL of oleic acid. 1.5 mL ethanol was added to the suspension and the suspension was centrifuged. The product was dispersed in 1.5 mL of hexane. After centrifuging, the transparent supernatant was collected and the precipitate was discarded. The final product was stored in hexane.

Transmission Electron Microscopy (TEM) and energy dispersive X-ray (EDX) were used to characterize Co@Fe$_2$O$_3$ particles. TEM micrographs showed relatively monodisperse core-shell particles. XRD analysis showed a majority of peaks coming from Co phase.

EXAMPLE 24

Synthesis of CoFe in Film and Bulk Forms from Co@Fe$_2$O$_3$ Core-Shell Particles Co@Fe$_2$O$_3$ nanoparticles with an average core diameter of 10 nm and shell thickness of 1–2 nm were obtained by the procedure described in Example 23. Co@Fe$_2$O$_3$ core-shell particles were converted into CoFe in film and bulk forms by the procedure described in Example 18.

Figure 30:
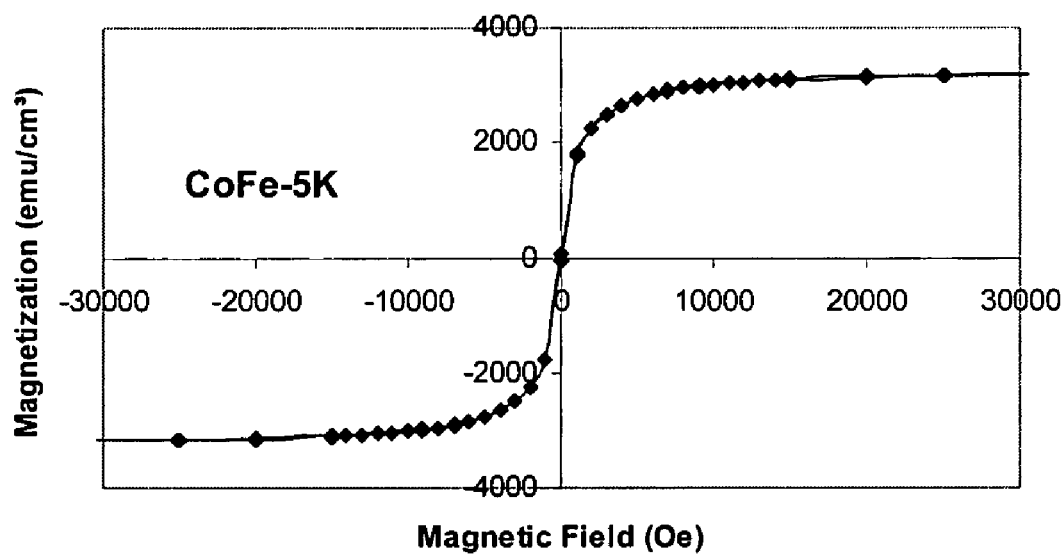
FIG. 30 is a graph showing SQUID analysis of the film of Example 24.

Energy Dispersive X-ray (EDX) and SQUID were used to characterize CoFe in film and bulk forms. FIG. 30 shows SQUID analysis of the resulting film. SQUID analysis shows that the CoFe alloy has coercivity of 20 Oe and the magnetization is over 3000 emu/cm$^3$ at 300 Kelvin. The composition was confirmed to have an atomic ratio of Co$_{55}$Fe$_{45}$ by EDX.

EXAMPLE 25

Synthesis of CoFe Particles from Co@Fe$_2$O$_3$ Core-Shell Particles

Co@Fe$_2$O$_3$ nanoparticles with an average core diameter of 10 nm and shell thickness of 1–2 nm were obtained by the procedure described in Example 23.

Co@Fe$_2$O$_3$ core-shell particles were deposited as a monolayer on a substrate using a Langmuir trough (model: KSV 3000) at a surface pressure of 45 mN m$^{-1}$. The substrate was covered with a piece of SiO$_2$ slide and transferred into a tube furnace to anneal under a flow of H$_2$ (5 v/v %) in Ar gas at 700° C. for 1 hour. Annealing was conducted by preheating to room temperature for 10 minutes, heating to 350° C. at a rate of 150° C./h and maintaining temperature for 2 hours, heating to 700° C. at a rate of 100° C./h and maintaining temperature for 1 hour, and cooling naturally to room temperature.

EXAMPLE 26

Synthesis of SmCo$_5$ Particles (~12–15 nm in Diameter)

0.030 g of Sm(acac)$_3$.xH$_2$O was preheated in three-neck 15 mL flask under vacuum in an oil bath at a temperature of 110° C. After maintaining vacuum for 40 minutes, a mixture of 60 µL of oleic acid, 0.1 g of 1,2-hexadecanediol, 0.2 g of 99% TOPO and 3 mL of octyl ether were added. 0.1 g of cobalt carbonyl (Co$_2$(CO)$_8$) was dissolved in 0.5 mL of octyl ether at 60° C. The oleic acid mixture was slowly heated to 150° C. with a heating mantle and the Co$_2$(CO)$_8$ solution was quickly injected. The color of the mixture showed dark green color when the Co$_2$(CO)$_8$ solution was injected and changed to dark black at a temperature of between 190° C. and 200° C. The mixture heated to 250° C. and that temperature was maintained for 30 minutes. 200 µL of the product mixture was transferred into a 2 mL vial. 1.8 mL of ethanol were added to induce precipitation of the nanoparticles. The nanoparticles were separated from solvent by centrifuging at 5000 rpm for 5 minutes. Yellow-brown supernatant was discarded and the black precipitated nanoparticles were recovered by suspension in 0.5 mL of hexane in the presence of 10 µL of oleic acid. 1.5 mL of ethanol was added and the suspension was centrifuged at 3000 rpm to precipitate the particles. The product was dispersed in 1.5 mL of hexane and centrifuged. The transparent supernatant was collected and the precipitate was discarded. The final product was stored in hexane.

Figure 31A:
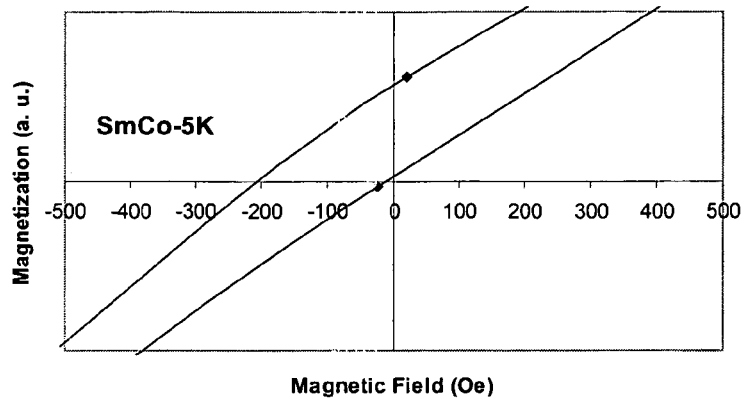
FIGS. 31(a) and 31(b) show SQUID analyses of the particles of Example 26.
Figure 31B:
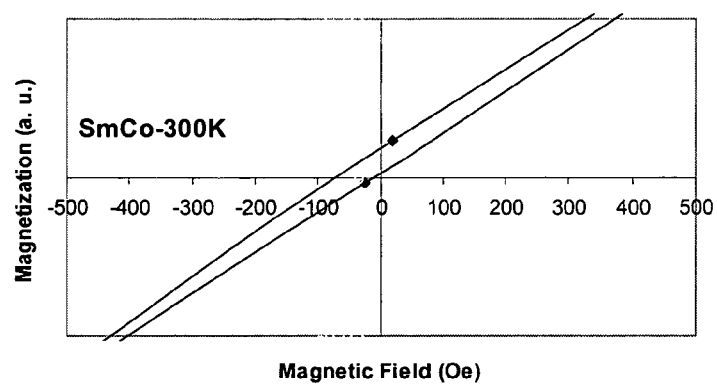
Figure 31C:
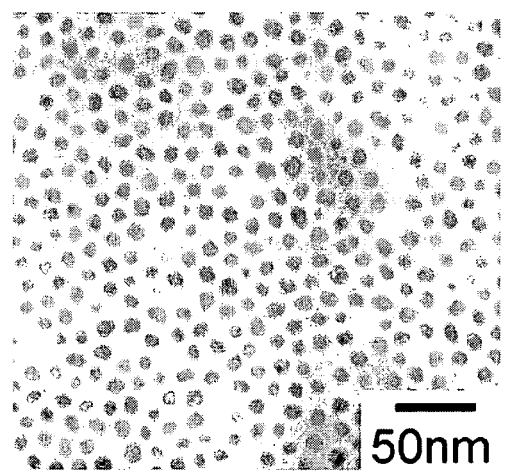
FIG. 31(c) is an TEM micrograph of the particles of Example 26.

Scanning Electron Microscopy (SEM), Powder X-ray Diffraction (XRD), single particle Energy-dispersive X-ray (EDX) and SQUID were conducted to characterize SmCo$_5$ particles. FIGS. 31(*a*) and 31(*b*) show SQUID analyses of the resulting film. SQUID analyses shows that the coercivity of SmCO$_5$ had a bias field of ~180 Oe at 5 Kelvin and 55 Oe at 300 Kelvin. FIG. 31(*c*) is an SEM micrograph. The micrograph showed relatively monodisperse SmCo particles with size of approximately 12–15 nm. The composition was confirmed to have an atomic ratio of Sm$_{16}$Co$_{84}$ by EDX.

EXAMPLE 27

Synthesis of SmCo$_5$ Particles of ~8–10 nm 0.030 g of Sm(acac)$_3$.xH$_2$O was preheated in three-neck 15 mL flask under vacuum in an oil bath at a temperature of 110° C. After maintaining vacuum for 40 minutes, a mixture of 60 μL of oleic acid, 0.1 g of 1,2-hexadecanediol, 0.2 g of 99% TOPO and 3 mL of octyl ether were added. 0.1 g of cobalt carbonyl ($Co_2(CO)_8$) was dissolved in 0.5 mL of octyl ether at 60° C. The oleic acid mixture was slowly heated to 150° C. with a heating mantle and the $Co_2(CO)_8$ solution was quickly injected. The color of the mixture showed dark green color when the $Co_2(CO)_8$ solution was injected and changed to dark black at a temperature of between 190° C. and 200° C. The mixture heated to 200° C., that temperature was maintained for 30 minutes and then the mixture was cooled. 200 μL of the product mixture was transferred into a 2 mL vial. 1.8 mL of ethanol were added to induce precipitation of the nanoparticles. The nanoparticles were separated from solvent by centrifuging at 5000 rpm for 5 minutes. Yellow-brown supernatant was discarded and the black precipitated nanoparticles were recovered by suspension in 1.0 mL of hexane in the presence of 10 μL of oleic acid. 1.0 mL of ethanol was added and the suspension was centrifuged at 4000 rpm to precipitate the particles. The supernatant was collected and the precipitate was discarded. 1.0 mL of ethanol was added to 1.0 mL of the supernatant and the mixture was centrifuged. The precipitate was collected and the supernatant was discarded. The final product was stored in hexane.

Figure 32:
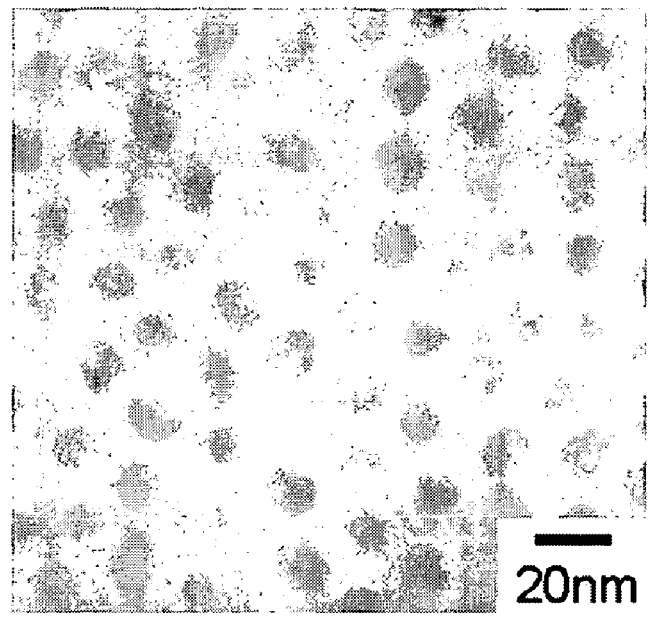
FIG. 32 is a TEM micrograph of the particles of Example 27.

Transmission Electron Microscopy (TEM), Powder X-ray Diffraction (XRD) and single particle Energy-dispersive X-ray (EDX) were conducted to characterize $SmCo_5$ particles. FIG. 32 is a TEM micrograph. The micrograph shows relatively monodisperse SmCo particles with a size of approximately 8–10 nm.

EXAMPLE 28

Synthesis of SmCo Particles of ~18–20 nm 0.030 g of $Sm(acac)_3.xH_2O$ was preheated in three-neck 15 mL flask under vacuum in an oil bath at a temperature of 110° C. After maintaining vacuum for 40 minutes, a mixture of 60 μL of oleic acid, 0.1 g of 1,2-hexadecanediol, 0.2 g of 99% TOPO and 3 mL of octyl ether were added. 0.1 g of cobalt carbonyl ($Co_2(CO)_8$) was dissolved in 0.5 mL of octyl ether at 60° C. The oleic acid mixture was slowly heated to 150° C. with a heating mantle and the $Co_2(CO)_8$ solution was quickly injected. The color of the mixture showed dark green color when the $Co_2(CO)_8$ solution was injected and changed to dark black at a temperature of between 190° C. and 200° C. The mixture heated to 290° C., that temperature was maintained for 30 minutes and then the mixture was cooled down. The mixture was stirred mechanically under argon protection. 200 μL of the product mixture was transferred into a 2 mL vial. 1.8 mL of ethanol were added to induce precipitation of the nanoparticles. The nanoparticles were separated from solvent by centrifuging at 5000 rpm for 5 minutes. Yellow-brown supernatant was discarded and the black precipitated nanoparticles were recovered by suspension in 1.0 mL of hexane in the presence of 10 μL of oleic acid. 1.0 mL of ethanol was added and the suspension was centrifuged at 4000 rpm to precipitate the particles. 1.0 mL of hexane and 1.0 mL of ethanol were added to the precipitate and the mixture was centrifuged. The final product was stored in hexane.

Figure 33:
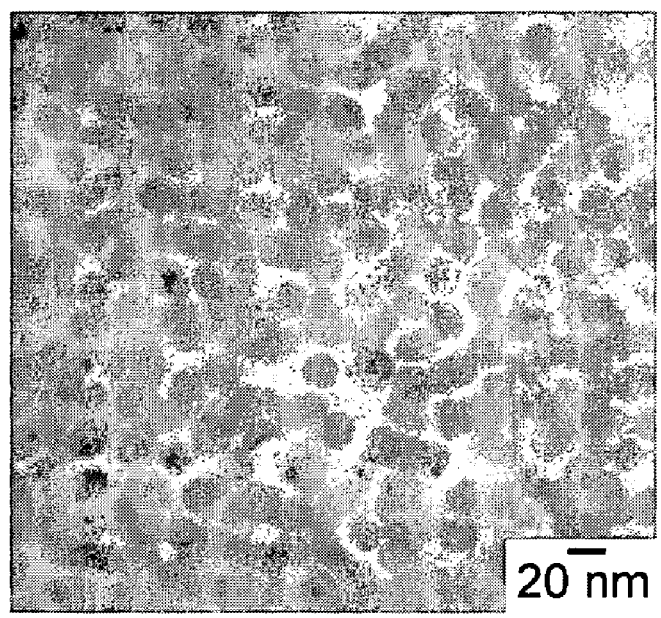
FIG. 33 is a TEM micrograph of the particles of Example 28.

Transmission Electron Microscopy (TEM), Powder X-ray Diffraction (XRD) and single particle Energy-dispersive X-ray (EDX) were conducted to characterize $SmCo_5$ particles. FIG. 33 is a TEM micrograph. The micrograph shows relatively monodisperse SmCo particles with a size of approximately 18–20 nm.

EXAMPLE 29

Synthesis of $SmCO_5@Fe_2O_3$ Core-Shell Particles (14 nm $SmCo_5$ Core and ~2 nm $Fe_2O_3$ Shell))

0.030 g of $Sm(acac)_3.xH_2O$ was preheated in three-neck 15 mL flask under vacuum in an oil bath at a temperature of 110° C. After maintaining vacuum for 40 minutes, a mixture of 60 μL of oleic acid, 0.1 g of 1,2-hexadecanediol, 0.2 g of 99% TOPO and 3 mL of octyl ether were added. 0.1 g of cobalt carbonyl ($Co_2(CO)_8$) was dissolved in 0.5 mL of octyl ether at 60° C. The oleic acid mixture was slowly heated to 150° C. with a heating mantle and the $Co_2(CO)_8$ solution was quickly injected. The color of the mixture showed dark green color when the $Co_2(CO)_8$ solution was injected and changed to dark black at a temperature of between 190° C. and 200° C. The mixture heated to 250° C. and that temperature was maintained for 30 minutes. The mixture was cooled to 160° C. and 30 μL of $Fe(CO)_5$ were injected. The mixture was then heated to 240° C. for 30 minutes. 200 μL of the product mixture was transferred into a 2 mL vial. 1.8 mL of ethanol were added to induce precipitation of the nanoparticles. The nanoparticles were separated from solvent by centrifuging at 5000 rpm for 5 minutes. Yellow-brown supernatant was discarded and the black precipitated nanoparticles were recovered by suspension in 0.5 mL of hexane in the presence of 10 μL of oleic acid. 1.5 mL of ethanol was added and the suspension was centrifuged at 3000 rpm to precipitate the particles. The product was dispersed in 1.5 mL of hexane and centrifuged. The transparent supernatant was collected and the precipitate was discarded. The final product was stored in hexane.

Figure 34A:
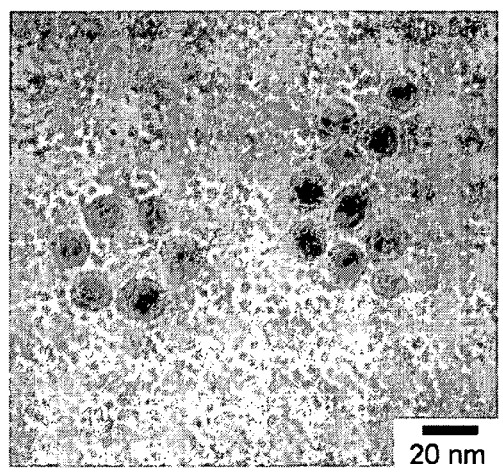
FIG. 34(a) is an TEM micrograph of the particles of Example 29.
Figure 34B:
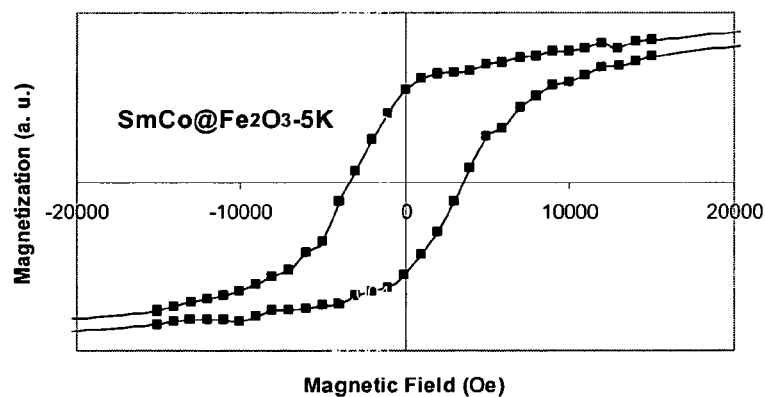
FIGS. 34(b) and 34(c) are graphs showing SQUID analyses of the particles of Example 29.
Figure 34C:
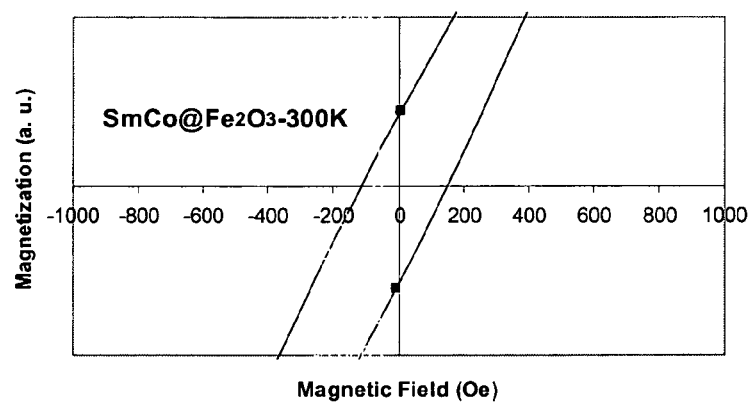
Figure 34D:
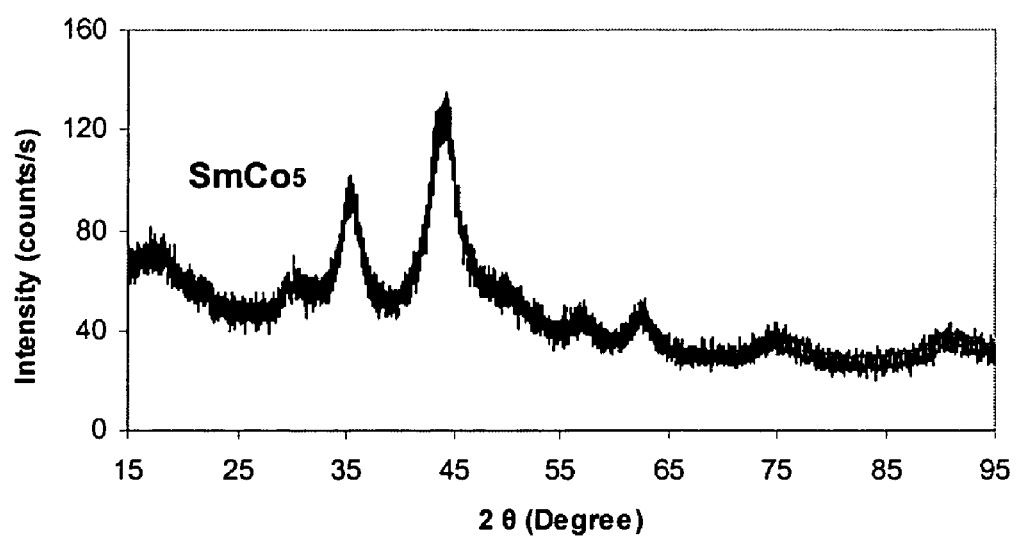
FIG. 34(d) is a graph showing XRD spectra for the particles of Example 29.

Transmission Electron Microscopy (TEM), Powder X-ray Diffraction (XRD), Energy-dispersive X-ray (EDX) and SQUID were conducted to characterize $SmCo_5$ particles. FIG. 34(a) is an TEM micrograph of the resulting film. The micrograph shows relatively monodisperse $SmCo@Fe_2O_3$ particles with overall size of approximately 17 nm. FIGS. 34(b) and 34(c) show SQUID analyses of the particles. SQUID analysis shows that the $SmCo_5@Fe_2O_3$ have a coercivity of coercivity of $SmCo_5@Fe_2O_3$ was 3600 Oe at 5 Kelvin and 170 Oe at 300 Kelvin. FIG. 34(d) shows XRD analysis of the resulting film. XRD analysis shows that the particles are the $SmCo_5$ phase. The composition was confirmed to have an atomic ratio of $Sm_{11}Co_{50}Fe_{39}$ by EDX.

While this invention has been described in conjunction with the exemplary embodiments and examples outlined above, various alternatives, modifications, variations, improvements and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later developed alternatives, modifications, variations, improvements and/or substantial equivalents.

What is claimed is:

1. A method of forming nanoparticles, comprising:
    forming a solution of a reducing agent and a solvent under an inert gas;

heating the solution to reflux;

adding a metal salt or organic metallic compound to the solution to form nanoparticle cores;

adding an organometallic compound to the solution and heating to form first core-shell nanoparticles by forming one or more shell layers over the nanoparticle cores; and heating the first core-shell nanoparticles to form the nanoparticles, the nanoparticles being selected from the group consisting of pure alloy nanoparticles and second core-shell nanoparticles, the second core-shell nanoparticles having cores or shells that differ in composition from respective cores or shells of the first core-shell nanoparticles.

2. The method according to claim 1, wherein the reducing agent comprises a 1,2-diol.

3. The method according to claim 2, wherein the 1,2-diol is selected from the group consisting of 1,2-hexanediol, 1,2-octanediol, 1,2-decanediol, 1,2-dodecanediol, and ethylene glycol.

4. The method according to claim 1, wherein the solvent is selected from the group consisting of octylether, phenylether and dichlorobenzene.

5. The method according to claim 1, wherein heating to reflux comprises heating to a temperature ranging between about 150° C. to about 300° C.

6. The method according to claim 1, wherein the metal salt is selected from the group consisting of $Pt(CH_3COCHCOCH_3)_2$, $Fe(CH_3COCHCOCH_3)_3$, $Co(CH_3COCHCOCH_3)_2$, $Sm(CH_3COCHCOCH_3)_3$, $Ag(CF_3COO)$ and $FeCl_2$.

7. The method according to claim 1, wherein the organometallic compound comprises at least one member selected from the group consisting of $Fe(CO)_5$, $Fe_2(CO)_9$, $Fe_3(CO)_{12}$, $Co_2(CO)_8$ and $Co_4(CO)_{12}$, and $Ni(CO)_4$.

8. The method according to claim 1, wherein a molar ratio of the metal salt or organic metallic compound to the organometallic compound is in a range of from about 10:1 to about 1:10.

9. The method according to claim 1, wherein a molar ratio of the metal salt or organic metallic compound to the organometallic compound is in a range of from about 3:1 to about 1:5.

10. A method of forming magnetic alloy nanoparticles, comprising:

forming a solution of a reducing agent and a solvent under an inert gas;

heating the solution to reflux;

adding a metal salt or organic metallic compound to the solution to form nanoparticle cores;

adding an organometallic compound to the solution and heating to form core-shell nanoparticles by forming one or more shell layers over the nanoparticle cores;

transferring the core-shell nanoparticles to a substrate; and thermally annealing the core-shell nanoparticles on the substrate to reduce the one or more shell layers and form exchange coupled magnetic alloy nanoparticles.

11. The method according to claim 10, wherein reducing agent comprises a 1,2-diol.

12. The method according to claim 10, wherein the core-shell nanoparticles are transferred to the substrate by Langmuir-Blodgett deposition.

13. The method according to claim 10, wherein the core-shell nanoparticles are transferred to the substrate by drop casting.

14. The method according to claim 10, wherein thermally annealing the core-shell nanoparticles takes place at a temperature ranging between about 400° C. to 650° C.

15. A method of forming a magnetic alloy nanoparticle film, comprising:

forming a solution of a 1,2-diol reducing agent and a solvent under an inert gas;

heating the solution to reflux;

adding a metal salt or an organometallic compound to the solution to form nanoparticle cores;

then adding an organometallic compound to the solution and continuing to heat to form core-shell nanoparticles by forming one or more shell layers over the nanoparticle cores;

transferring the core-shell nanoparticles to a substrate;

thermally annealing the core-shell nanoparticles to reduce the one or more shell layers and form an exchange coupled magnetic alloy thin film.

16. The method according to claim 15, wherein the reducing agent comprises a 1,2-diol.

17. The method according to claim 15, wherein the reducing agent comprises a 1,2-hexadecanediol.

18. The method according to claim 15, wherein the core-shell nanoparticles are transferred to the substrate by Langmuir-Blodgett deposition.

19. The method according to claim 15, wherein the core-shell nanoparticles are transferred to the substrate by drop casting.

20. The method according to claim 15, wherein thermally annealing the core-shell nanoparticles takes place at a temperature ranging between about 400° C. to 650° C.

21. The method according to claim 15, wherein the exchange coupled magnetic alloy is $Fe_3Pt$—FePt.

22. The method according to claim 15, wherein the exchange coupled magnetic alloy is FePt—Fe.

23. The method according to claim 15, wherein the exchange coupled magnetic alloy is PtCo—FeCo.

24. A method of forming an alloy magnet, comprising:

forming a solution of a reducing agent and a solvent under an inert gas;

heating the solution to reflux;

adding a metal salt to the solution to form nanoparticle cores;

adding an organometallic compound to the solution and heating to form core-shell nanoparticles by forming one or more shell layers over the nanoparticle cores;

transferring the core-shell nanoparticles to a substrate; and thermally annealing the core-shell nanoparticles to reduce the one or more shell layers and form an exchange coupled alloy magnet.

25. The method according to claim 24, wherein the reducing agent comprises a 1,2-diol.

26. The method according to claim 24, wherein the reducing agent comprises a 1,2-hexadecanediol.

27. The method according to claim 24, wherein the exchange coupled magnetic alloy is $Fe_3Pt$—FePt.

28. The method according to claim 24, wherein the exchange coupled magnetic alloy is FePt—Fe.

29. The method according to claim 24, wherein the exchange coupled magnetic alloy is PtCo—FeCo.

30. A method of forming nanoparticles, comprising:

forming a solution of a reducing agent and a solvent under an inert gas;

heating the solution to reflux;

adding a metal salt to the solution to form nanoparticle cores;

adding an organometallic compound to the solution and heating to form first core-shell nanoparticles by forming one or more shell layers over the nanoparticle cores;

transferring the first core-shell nanoparticles to a substrate; and thermally annealing the first core-shell nanoparticles to reduce the one or more shell layers and form the nanoparticles, the nanoparticles being selected from the group consisting of pure alloy nanoparticles and second core-shell nanoparticles, the second core-shell nanoparticles having cores or shells that differ in composition from respective cores or shells of the first core-shell nanoparticles.

31. The method according to claim 30, wherein the reducing agent comprises a 1,2-diol.

32. The method according to claim 30, wherein the reducing agent comprises a 1,2-hexadecanediol.

33. The method according to claim 30, wherein the nanoparticles are selected from the group consisting of FePt@Fe, CoPt@CoO and CoPt@CoFe.

* * * * *